United States Patent
Sagazio et al.

(10) Patent No.: US 12,212,510 B2
(45) Date of Patent: Jan. 28, 2025

(54) CLOSED-LOOP BAUD RATE CARRIER AND CARRIER FREQUENCY TUNING FOR WIRELESS CHIP-TO-CHIP INTERFACE

(71) Applicant: Intel Corporation, Santa Clara, CA (US)

(72) Inventors: Peter Sagazio, Portland, OR (US); Chun C. Lee, Portland, OR (US); Stefano Pellerano, Beaverton, OR (US); Christopher D. Hull, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 894 days.

(21) Appl. No.: 17/124,536

(22) Filed: Dec. 17, 2020

(65) Prior Publication Data

US 2022/0200750 A1    Jun. 23, 2022

(51) Int. Cl.
*H04L 5/00* (2006.01)
*H04B 1/10* (2006.01)

(52) U.S. Cl.
CPC ......... *H04L 5/0048* (2013.01); *H04B 1/1036* (2013.01)

(58) Field of Classification Search
CPC .............. H04L 5/0048; H04L 27/2035; H04L 27/2275; H04L 27/2659; H04L 27/266; H04L 5/06; H04B 1/1036; H04B 1/1027; H04B 1/10; H04B 1/38; H04B 1/40; H03D 7/163
See application file for complete search history.

(56) References Cited

U.S. PATENT DOCUMENTS

| | | | |
|---|---|---|---|
| 6,115,584 A * | 9/2000 | Tait | H04B 1/40 455/75 |
| 6,980,589 B1 * | 12/2005 | Babb | H03J 1/005 375/295 |
| 11,996,874 B1 * | 5/2024 | Keller | H04B 1/1027 |

(Continued)

FOREIGN PATENT DOCUMENTS

| | | | |
|---|---|---|---|
| GB | 1579488 A * | 11/1980 | E21B 47/182 |
| JP | 2001267950 A | 9/2001 | |
| WO | 0062470 A1 | 10/2000 | |

OTHER PUBLICATIONS

FOR (Year: 2016).*

(Continued)

*Primary Examiner* — Lana N Le
(74) *Attorney, Agent, or Firm* — Viering, Jentschura & Partner mbB

(57) ABSTRACT

Various aspects of this disclosure provide a receiver. The receiver may include a down-converter configured to down-convert a received communication signal at a predefined carrier frequency, with a reference signal received from a reference signal generator, and a processor configured to perform a signal quality detection to identify a signal quality metric of the received communication signal at the predefined carrier frequency, and to provide a frequency adjusting signal to the reference signal generator to change the frequency of the reference signal based on the performed signal quality detection to identify the signal quality metric of the received communication signal at the predefined carrier frequency.

19 Claims, 15 Drawing Sheets

(56) References Cited

U.S. PATENT DOCUMENTS

| | | | |
|---|---|---|---|
| 2003/0152168 A1* | 8/2003 | Awater | H04L 23/02 375/329 |
| 2005/0118964 A1* | 6/2005 | Johnston | H04W 48/20 455/121 |
| 2007/0249306 A1* | 10/2007 | Pellat | H04B 1/30 455/130 |
| 2011/0096814 A1* | 4/2011 | Wu | H04L 27/2659 |
| 2013/0114536 A1* | 5/2013 | Yoon | H04L 5/0051 370/329 |
| 2015/0056939 A1* | 2/2015 | Ong | H04B 1/109 455/306 |
| 2017/0170872 A1 | 6/2017 | Kuo et al. | |
| 2017/0195002 A1* | 7/2017 | Sestok | H04L 7/0331 |
| 2017/0238261 A1* | 8/2017 | Benjebour | H04L 5/0048 370/329 |
| 2019/0363919 A1* | 11/2019 | Bai | H04L 27/266 |
| 2019/0372577 A1 | 12/2019 | Yehezkely | |

OTHER PUBLICATIONS

European Search Report issued for the corresponding European Application No. 21 19 4568, dated Feb. 10, 2022, 1 page (for informational purposes only).

Townley, Andrew et al., "A Fully Integrated, Dual Channel, Flip Chip Packaged 113 GHz Transceiver in 28nm CMOS supporting an 80 Gb/s Wireless Link", IEEE, 2020, 4 pages, 2020 IEEE Custom Integrated Circuits Conference (CICC), Boston, MA, USA.

* cited by examiner

| | eXtra Short Range (WXSR) | Short Range (WSR) | Long Range (WLR) |
|---|---|---|---|
| Link type | point-to-point | multipoint-to-multipoint | multipoint-to-multipoint |
| Power Efficiency | 1pJ/b | 3pJ/b | 5pJ/b |
| Channel Length | 1-4mm | 5-10mm | 100mm |
| Latency | 2ns | 3-4ns | 5ns |
| BER | 1e-12 | 1e-12 | 1e-6 (raw) |
| Data rate | >500Gbps aggregate | >200Gbps per link | >200Gbps per link |
| Si Area efficiency | > 500 Gbps/mm^2 | 200 Gbps/mm^2 | 200 Gbps/mm^2 |

810

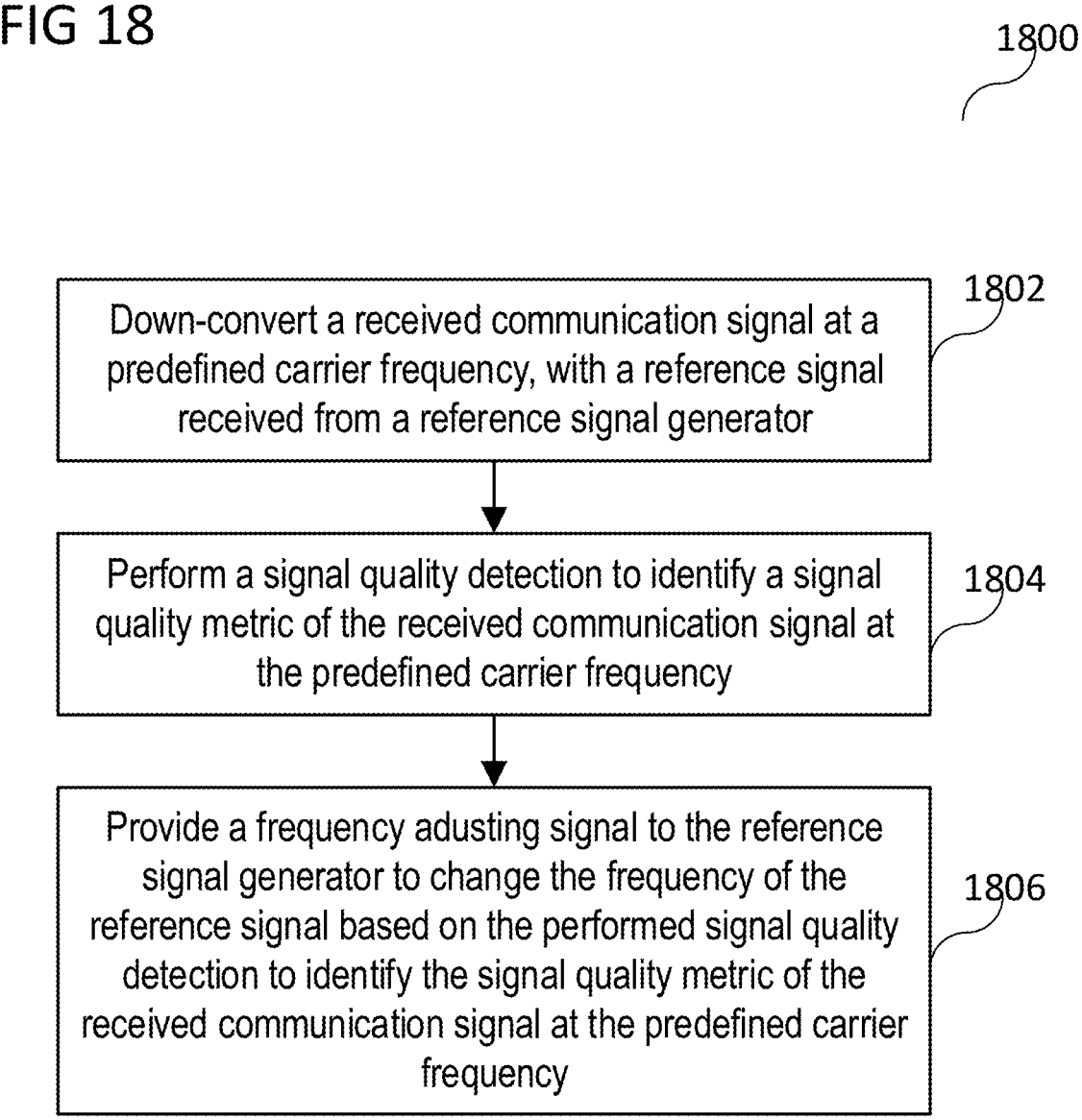

CLOSED-LOOP BAUD RATE CARRIER AND CARRIER FREQUENCY TUNING FOR WIRELESS CHIP-TO-CHIP INTERFACE

TECHNICAL FIELD

Various aspects of this disclosure generally relate to a communication system, e.g. to a wireless chip-to-chip communication system.

BACKGROUND

Various aspects of this disclosure generally may relate to the field of wireless communications.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 18 exemplarily shows a flow diagram illustrating a method according to various aspects.

DESCRIPTION

The following detailed description refers to the accompanying drawings that show, by way of illustration, specific details and embodiments in which the invention may be practiced.

Illustratively, various aspects may reduce equalizer complexity by slow closed-loop tuning of the interface carrier frequency and symbol rate to minimize inter-symbol interference (ISI) produced by magnitude and phase ripple in the channel frequency response, e.g. in a wireless chip-to-chip (also referred to as die-to-die) communication system. A controller at the receiver adjusts the interface frequency within a predetermined range by programming the fractional-N multiplication ratio at the reference phase locked loop (PLL), based on detection and minimization of received EVM or eye opening. Such tuning capability is particularly useful with wireless die-to-die interfaces.

Figure 1:
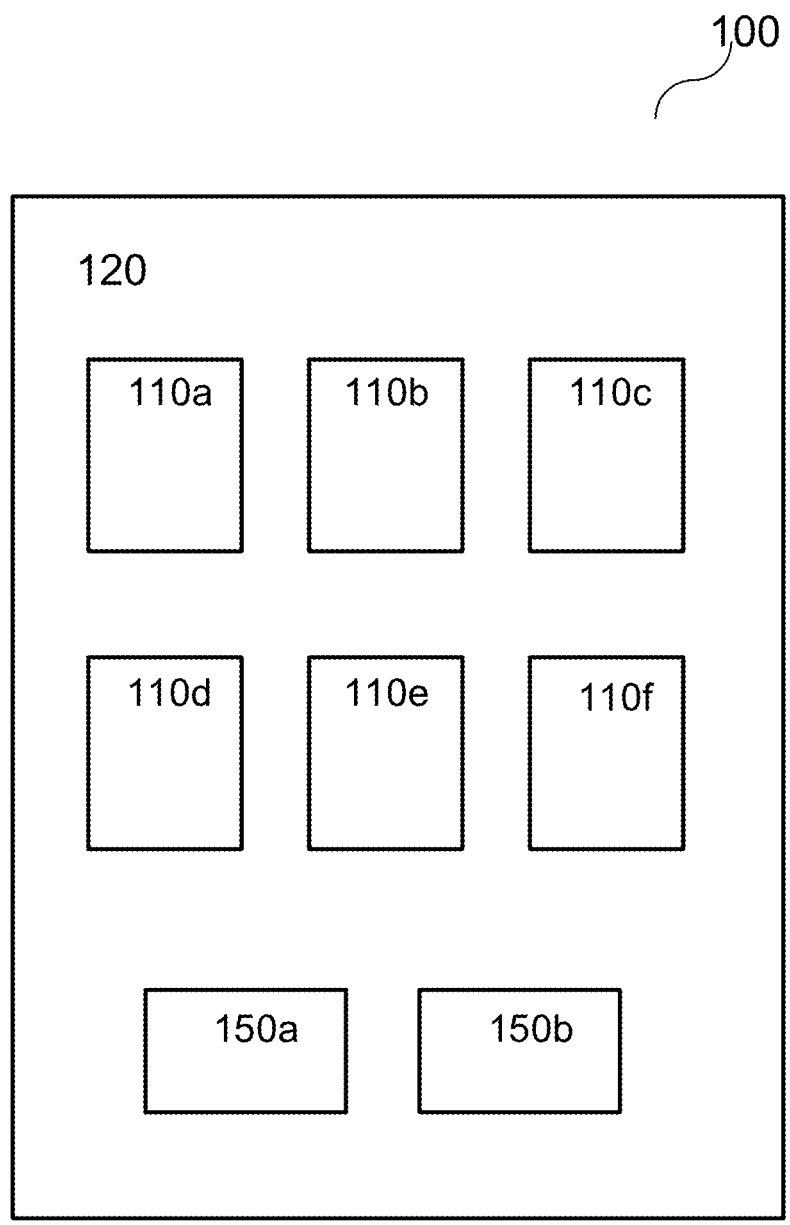
FIG. 1 exemplarily shows a simplified representation of a multi-chip electronic device.

FIG. 1 shows a simplified representation of a multi-chip electronic device 100. The device 100 includes a plurality of chiplets 110*a-f*. Each of the chiplets 110*a-f* may include one or a plurality of processor cores or cores. In addition to the chiplets 110*a-f*, the electronic device 100 may include other hardware and/or software resources as represented by the blocks 150*a* and 150*b*. For example, the electronic device 100 may include elements or components such as, for example, processors (e.g., CPU, GPU, AI engine, etc.), random access memory (RAM), read-only memory (ROM), erasable programmable ROM (EPROM), electrically erasable programmable ROM (EEPROM), application specific integrated circuit (ASIC), etc.), software, hardware, firmware.

The device 100 may include a base layer or a carrier 120 (also denoted as package carrier) for mounting on which the chiplets and other components can be mounted. In some cases, the carrier 120 may be a printed circuit board (PCB) including wired connections between the components, e.g., wired connections between the chiplets and wired connections for the resources 150*a-b*. One or more package carriers can be arranged on another common carrier (also denoted as board).

The device 100 of FIG. 1 can be considered as 2D (two-dimensional) device because the components are mounted on a single plane. However, the above approach may be of less value because area of the mounting plane (e.g., real estate) may not be sufficient to allow enough components for a particular application. Further, the connections of a base layer like a PCB (e.g., conductive traces) may be unsuitable for applications requiring a structure with fast interconnections.

Figure 2:
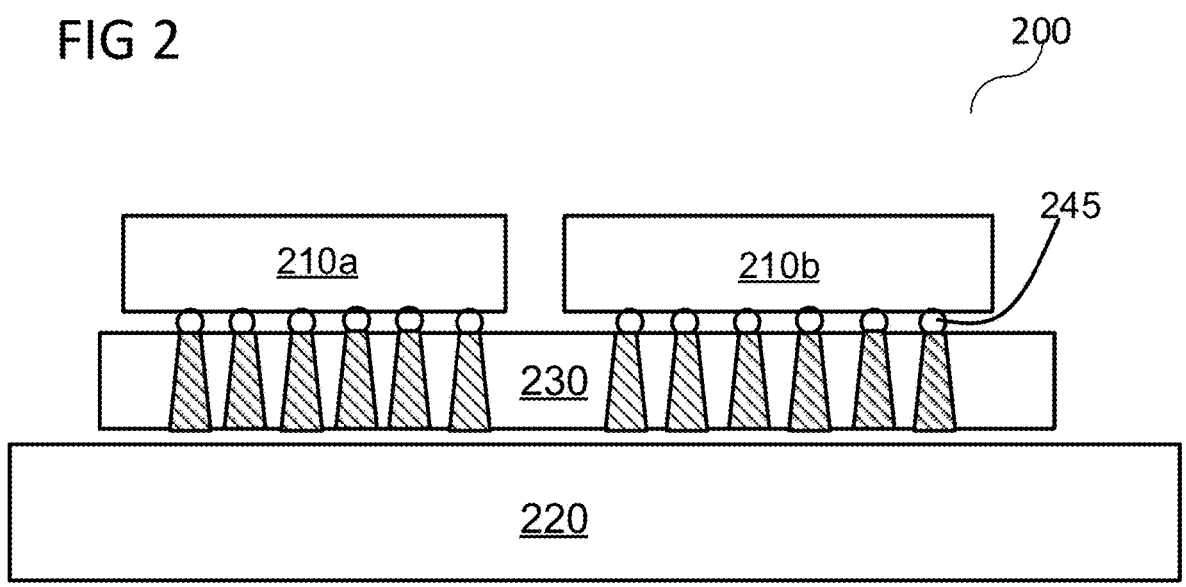
FIG. 2 exemplarily shows another architectural approach for increasing computational power using 2.5-dimensional package.

Another architectural approach for increasing computational power is the use of 2.5 dimensional (2.5 D) packages. One example of a 2.5D package is shown in the device 200 of FIG. 2. Conventional 2.5D packages, can include multiple components, e.g., chips or chiplets mounted on an interposer. Conventionally, 2.5D semiconductor package place several chips side-by-side on a silicon interposer. This can be seen in FIG. 2, where in the device 200, the chips or chiplets 210*a* and 210*b* are mounted using bumps 245 on the interposer 230. The interposer 230 itself can be mounted on the base layer or package carrier or carrier 220.

An interposer is an electrical interface between connectors. For example, an interposer can provide interconnections between the components (e.g., chips, chiplets, etc.), as well as the external input/outputs (I/O) through the use of through carrier vias or Through-Silicon-Vias (TSV). Interposers can be silicon interposers that have lateral dimensions larger than the chips or components they are interconnecting.

Further, 2.5D package devices may also include bridges. For example, silicon bridges are a small piece of silicon that can be embedded under the edges of two components and provide interconnections therebetween. This can allow for most chips or components to be attached in multiple dimensions and thus eliminating additional physical constraints on heterogeneous chip attachment within the theoretical limits. In other words, embedded multi-die interconnect bridge (EMIB) or bridges are essentially embedded into a standard package carrier and are used to provide high interconnect density exactly where needed, while the rest of a standard package carrier can be used for the rest of the interconnects.

Another architectural approach for improving such a device is the use of three-dimensional (3D) stacking of semiconductor devices or components. The components (e.g., chips or chiplets) can be arranged in 3 dimensions instead of 2 dimensions. This allows the components of a device or module to be placed in closer proximity to one another.

Figure 3A:
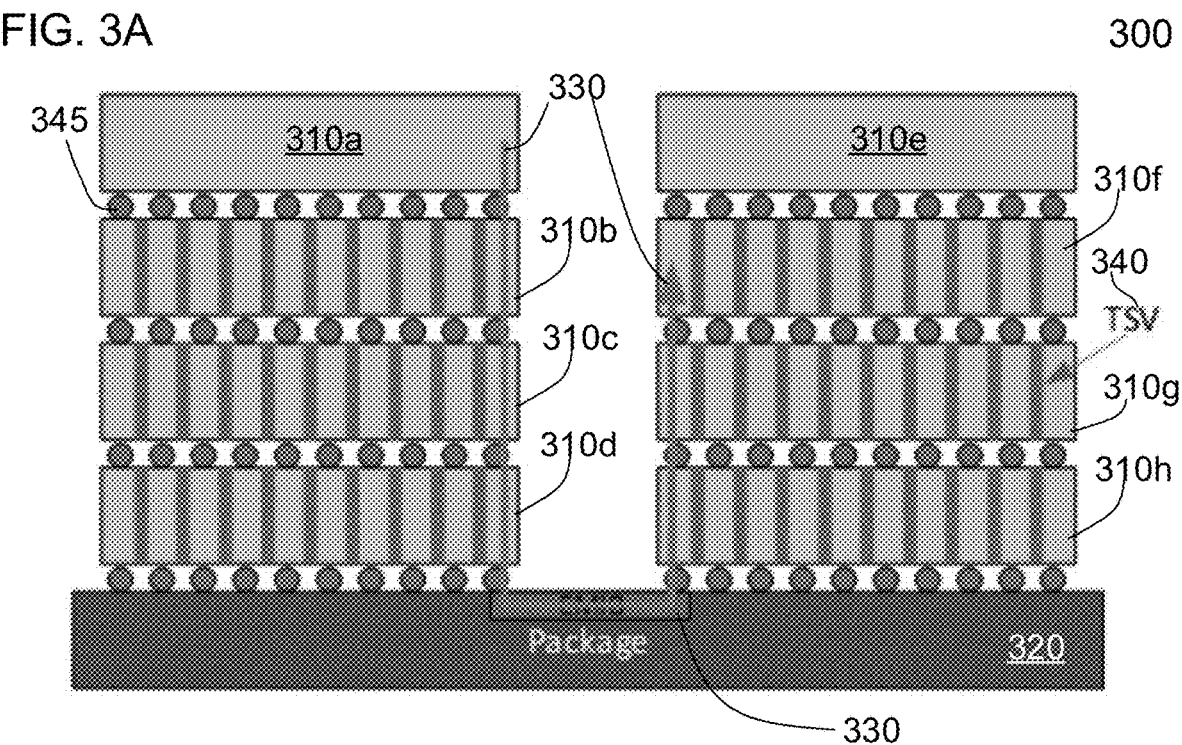
FIG. 3A and FIG. 3B exemplarily show an example of a module device of an 3D heterogeneous integration of integrated circuits or components.
Figure 3B:
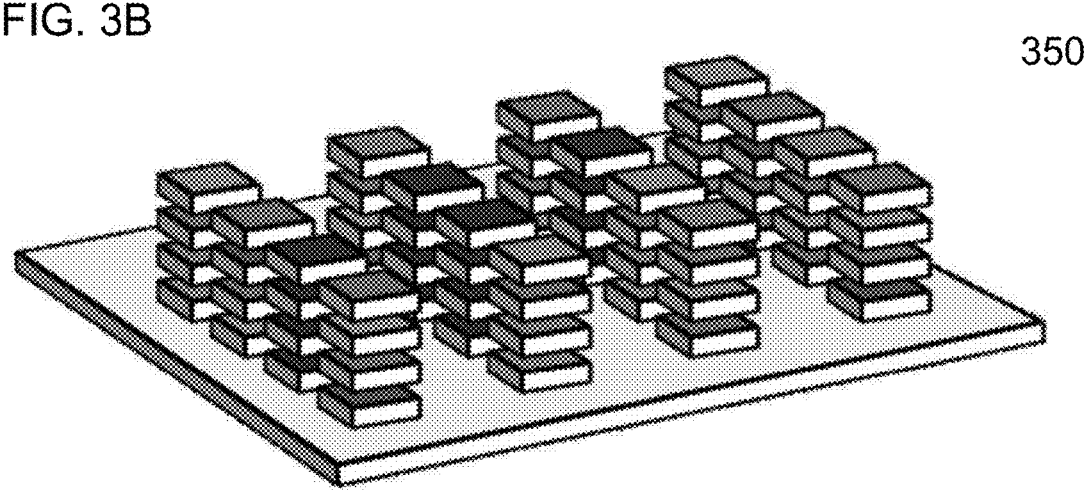

The module device 300 of FIG. 3A and FIG. 3B is one example of a 3D heterogeneous integration of integrated circuits or components (e.g., chiplets). The device 300 integrates disaggregated components in vertical stacks. The device includes at least a first vertical stack of chiplets 310a-d and a second vertical stack of chiplets 310e-f. In some examples, the chiplets may be any type of hardware component, e.g., include any type of processor (e.g., CPU, GPU, etc.), artificial intelligence (AI) engine, accelerator, memory, or other suitable or desired component. As shown, the vertically adjacent chiplets are connected to one another using TSVs 340 and bumps 345. Further, the package carrier 320 providing a mount for each stack can further include a bridge 330 for connecting the vertical stacks of chiplets. Specifically, the bridge 330 can directly connect the lower chiplet/component 310d of one stack with the lower chiplet/component 310h of the second stack. One example of a bridge is an embedded multi-die interconnect bridge (EMIB).

3D integration may provide improved speed between components (e.g., chips) as average wire length becomes shorter, and thus leading to shorter propagation delay and improved overall performance. 3D heterogonous integrated devices may be built with a Manhattan-like architecture which includes large X-Y arrays of heterogeneous chiplets (e.g., CPU, GPU, AI, memory, etc.) and each chiplet can be positioned like in the chess board having several stacked dice. FIG. 3B depicts a device 350 which is an MCM implemented with a Manhattan architecture. The vertical dimension allows for greater connectivity and more design possibilities. Further, the 3D heterogeneous integration of resources may provide devices that provide improved performance while consuming lower power due to shorter wires which lead lower power consumption and less parasitic capacitance. Reducing the power budget leads to less heat generation, extended battery life, and lower cost of operation.

Nevertheless, the above-mentioned technologies do not scale well for massive 3D integration because the data rate per line may only be 2 to 10 Gbps. For example, referring structure to the wired interconnection approach for the device 300, no chiplets or components other than the lower two chiplets 310d and 310h have a direct connection. Therefore, if the chiplet 310a needs to connect and communicate with the chiplet 310f, the data path 330 would have to be one that runs through the TSVs 340 of the chiplets 310b-310 on the first stack, through the EMIB 330, and then through the TSVs 340 of the chiplets 310g and 310h before arriving at the chiplet 310f. Therefore, communication between chiplets would often require the use of many connections. As more and more components are added which need to communicate with each other, the more the traffic in the TSVs, EMIBs, interposers, etc. increases. This increase in traffic presents problems in cases where high-transport data connections are needed.

For example, to create an aggregate data transport of 1 Tbps, 100 to 500 interconnect lines would be needed. While such data transports may be accomplished for communication between neighboring structure chips, it would be physically and economically unfeasible to provide such data transports for larger integrations that involve hundreds of interconnect lines between horizontally and vertically stacked chips.

Further, the cost of a silicon interposer is proportional to the area of that interposer. So, in cases needing several or many localized high-density interconnects, the costs can quickly accumulate.

In short, TSV silicon interposers are relatively expensive and do not scale well for applications that require a massive number of components e.g., chiplets. Further, wires (interconnects) that connect together chips or chiplets degrade in performance with scaling. That is, wires can dominate the performance, functionality and power consumption of ICs.

Wireless Chip-to-Chip interconnect is an approach for realizing high-speed data transport that would meet the requirements for high-performance computing products and applications. The wireless chip-to-chip (WC2C) technology can complement wired communications. WC2C can provide additional flexibility for high-performance computing products by enabling broadcast and multipoint-to-multipoint links with significant advantages to dynamically reconfigurable data-center networks.

Figure 4:
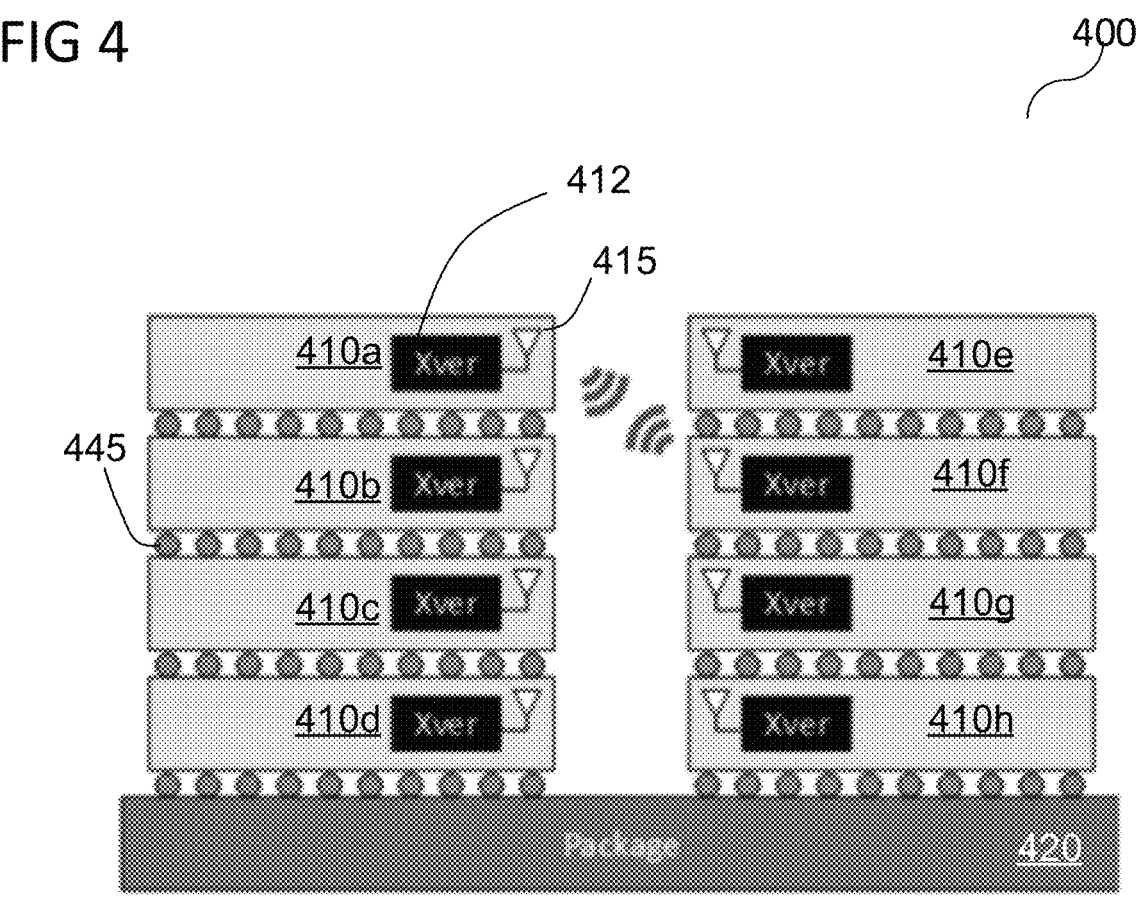
FIG. 4 exemplarily shows an example of a multi-chip module incorporating wireless interconnections.

FIG. 4 shows an example of a multi-chip module (MCM) 400 incorporating wireless interconnections. The multi-chip module 400 includes a 3D integration of disaggregated resources (e.g., chiplets 410a-h).

The chiplets 410 can be stacked and mounted on a package carrier 420. To enable wireless connection, each chiplet 410 or component can include an antenna or antenna structure 415 and radio circuitry, e.g., transceiver circuitry 412. In addition, module 400 can include or provide wired communication between components. Similar to the module 300 of FIG. 3A, the chiplets 410 may include TSVs (not shown) and bumps 445 that can allow for vertical interconnection. Further, the package carrier 420 can include bridges (e.g., EMIBs) and other types of interconnects or routing lines for providing connections between components.

WC2C communication may be used for dense chiplet based products and supplement existing chip to chip communications, e.g., wired interconnections. As shown in the example of FIG. 4, a first chiplet 410a can directly communicate wirelessly with a sixth chiplet 410f. Therefore, in aspects of the present disclosure, the use of WC2C communication can be used to greatly relieve or reduce the data traffic through TSVs, interposers, or bridges and improve device performance, efficiency and allow for greater and more massive 3D heterogeneous integration.

According to aspects of the present disclosure, to implement WC2C communication, a multi-chip module such as the module 400 may implement protocols that can be divided into control plane and data plane.

The data plane carries the network data (e.g., in-module data) in accordance with the directives of the control plane. That is, the data plane performs the actual forwarding of the data according to the configuration or routing paths managed and set forth by the control plane.

In at least some cases, the data plane of WC2C communications may operate with frequencies in the 110-170 GHz D-band using CMOS circuits with economic power efficiency. For example, in some aspects, the antennas may have approximately 1 mm of spacing. As CMOS technology continues to evolve and improve, higher frequencies, the reduction of the size and spacing of antenna elements, and higher bandwidths can be realized.

Different implementations or cases can be used for providing in-package such as WC2C communication. For example, three types of communications may be used for in-package or in-module communications include, wireless extra-short reach (WXSR), wireless short reach (WSR) and wireless long reach (WLR), as summarized in FIG. 5D.

FIG. 5A to FIG. 5D show examples of these three types of wireless links that can be used for intra-device configurations. In each case, the dice may be formed on a common carrier, also denoted as a base layer, an active base die, a base die, a package carrier or a board.

Figure 5A:
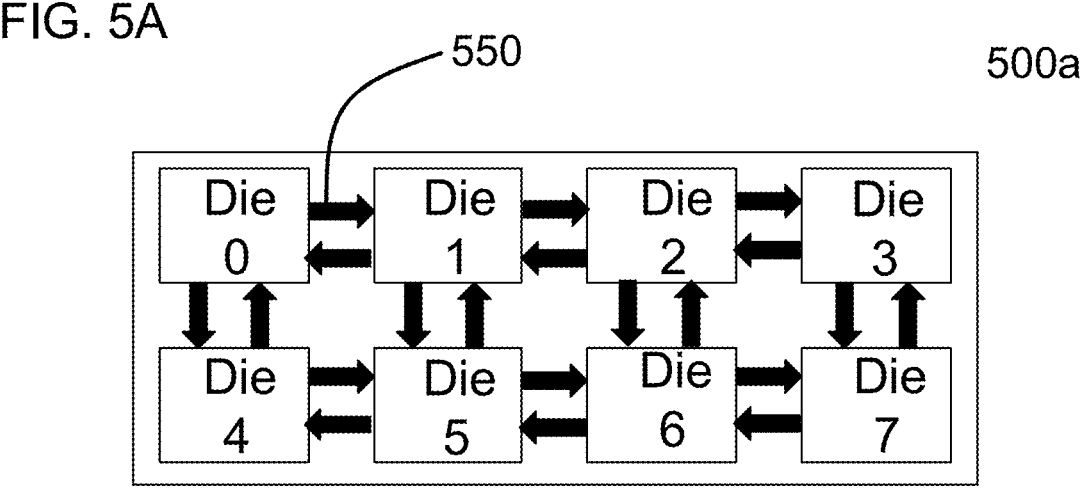
FIG. 5A to FIG. 5D exemplarily show examples of three types of wireless links that can be used for intra-module configurations.

The multi-chip module 500a or simply module 500a, illustrated in FIG. 5A, includes WXSR communication which allows for point-to-point links 550a between adjacent or immediately neighboring structure chips. In one example, adjacent or neighboring structure dice may be separated by 1 mm to 4 mm spacing. This type of wireless communication is akin to a bridge connection, e.g., an EMIB.

Figure 5B:
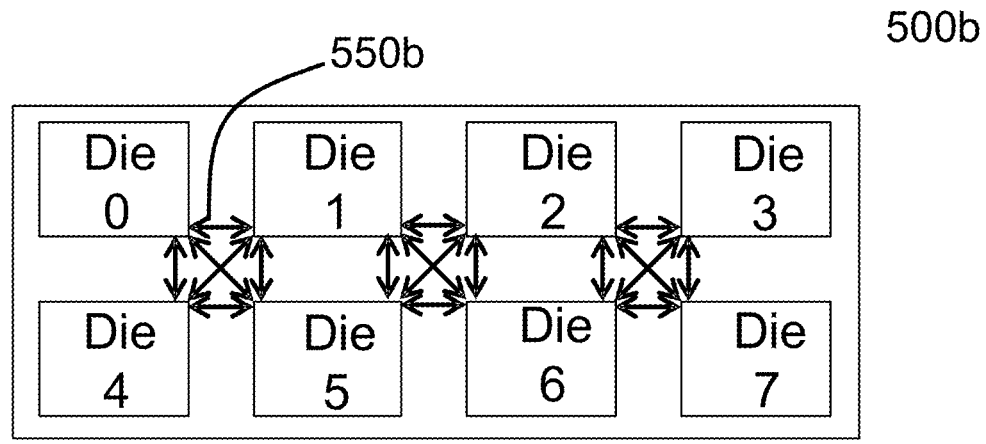

The multi-chip module 500b, illustrated in FIG. 5B, includes WSR communication. As shown, the WSR communication links 550b include point-to-point links like WXSR communication, but also include diagonal links amongst the kitty-corner dice, and thus provide or enable multipoint-to-multipoint links. For example, die 0 can now directly have wireless links with die 5 in addition to links die 1 and die 4. By contrast, in the module 500a implementing WXSR communication, die 0 only has direct wireless links with die 1 and die 4. The configurable diagonal link adds a degree of design flexibility over current wired interconnects because it enables a direct link amongst kitty-corner dice without having to hop-switch-hop across dice.

Figures 5C, 5D:
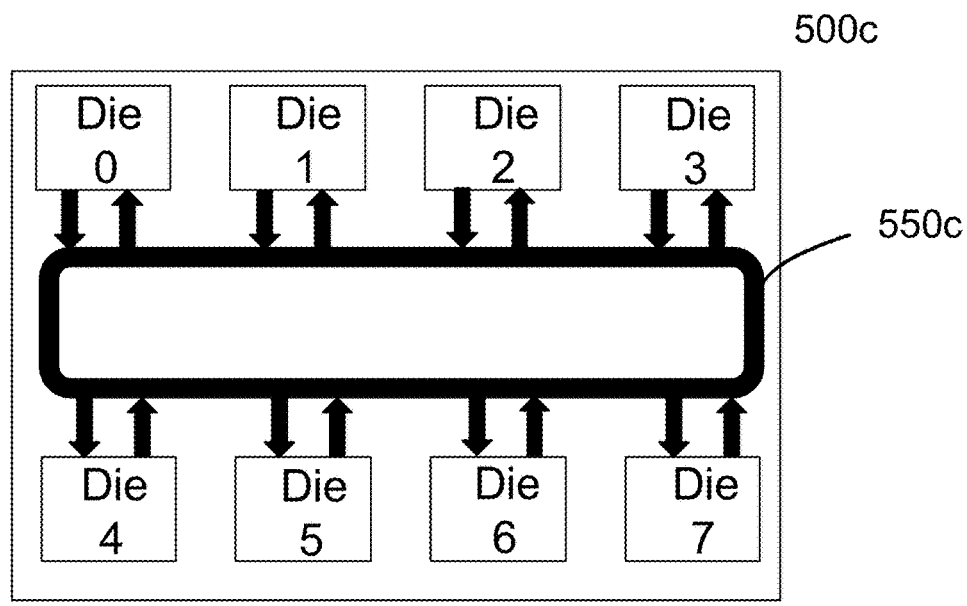

The multi-chip module 500c, illustrated in FIG. 5C, portrays WC2C communication using WLR. As shown, the WLR communication 550c can enable mesh-type wireless communication amongst several dice. As in WSR, the communication amongst dice is a direct link. That is, data communication can be accomplished without having to hop-switch-hop over many dice. WLR can also enable broadcasting to many or all the dice (e.g., dice 0-7 in 500c) on a mesh. In each of the cases, e.g., modules 500a, 500b, and 500c the WC2C may be capable of full duplex communication.

WC2C communication can be done for in-package links and may similarly be used for or applied to package-to-package wireless communications.

While the examples of WXSR, WSR, and the WLR communication in FIG. 5A to FIG. 5D are shown implemented in a planar or 2D environment, such types or similar types of communication may also be extended vertically. The wireless links, e.g., point-to-point, broadcast, etc. may also be implemented to allow one component (e.g. chiplet) to communicate with another chiplet disposed on another different elevation. Said differently, wireless communication links may allow for communication along the z-direction (vertical).

The modules implementing WC2C communication can include control plane capabilities. That is, to augment the above-mentioned high-speed wireless data links or the data plane, control plane capabilities or functionalities can be included in the modules. Control plane functions implemented using wireless control signaling can establish the wireless data connections described herein. The control plane protocols can be used to establish wireless connections within a module or package and further to define routing paths for the data. For example, industry protocols, including Wi-Fi, I2C, USB, and/or other known protocol may be used.

Figure 6:
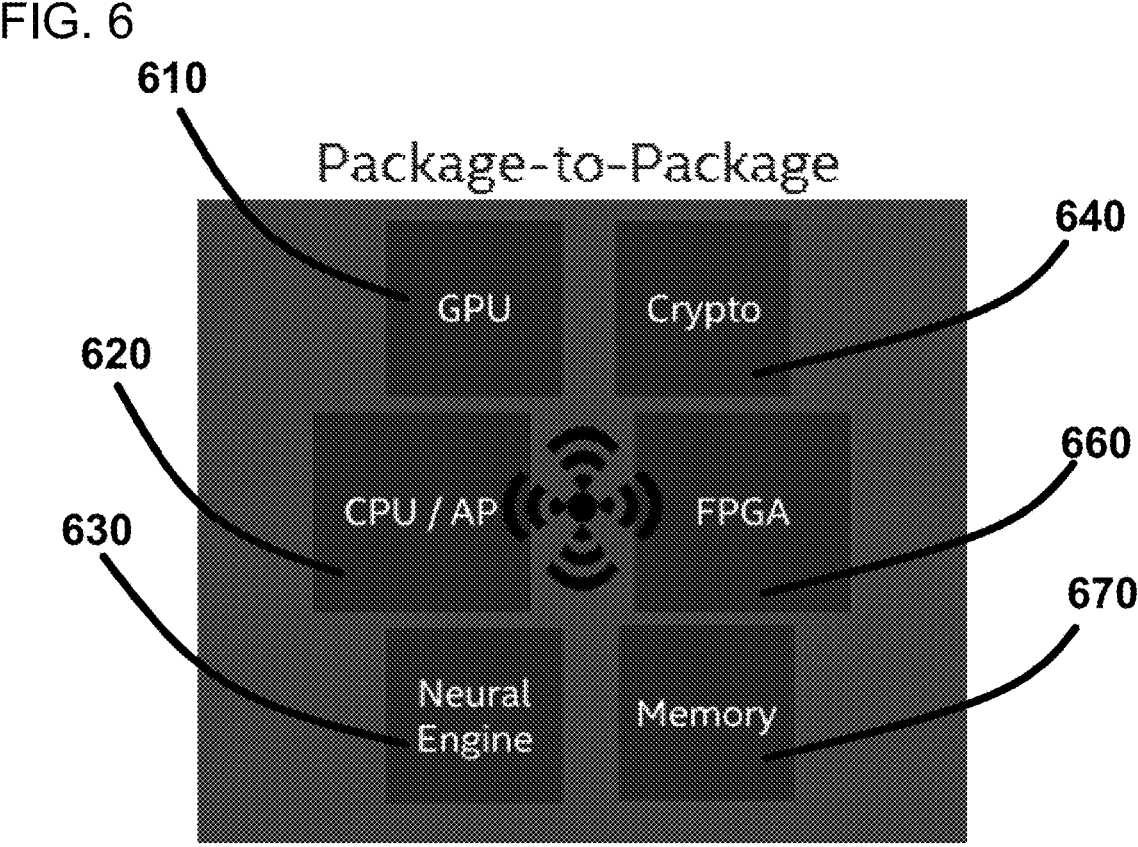
FIG. 6 exemplarily shows a schematic example of a package according to various aspects.

Control plane messages or control signaling may be in the form of packets to inform other components on where to forward data or data messages. In some aspects, the control plane messages of a multi-chip module may be implemented by using frequencies that differ from the data or data plane messages to manage and configure network data or data being transmitted to and from the components of a multi-chip device. In some cases, the messages may be implemented in a package-to-package type of communication scheme. For example, as described herein, a multi-chip device may include components that have their own individual packaging. (This is in contrast to a multi-chip module of chiplets which may be packaged together (e.g., the dice of the chiplets share a common package). In such cases, the multi-chip device may include wireless package-to-package communications. This is the scenario illustrated in FIG. 6, where in the device 600, the several components (GPU 610, CPU 620, Neural Engine 630, Cryptoprocessor 640, Field-programmable gate array (FPGA) 660, Memory device 670) have their own packaging which includes wireless circuitry to implement wireless package-to-package communications. Illustratively, the control plane prepares the communication devices for a (high volume and high data rate) data communication via the data plane.

The control plane may manage communication not only for traffic within a multi-chip package (also denoted as in-package communication), but also may manage the communication between modules or packages e.g., multi-chip modules or packages.

Figure 7:
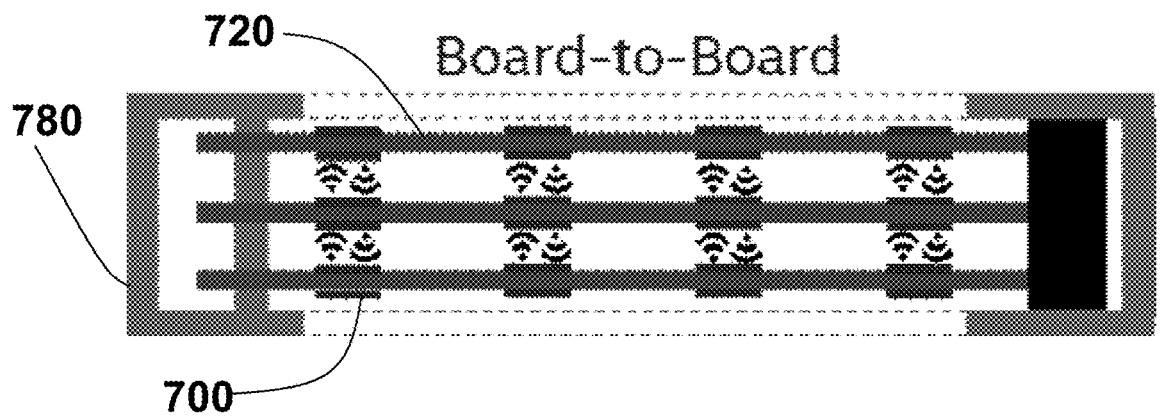
FIG. 7 exemplarily shows board-to-board communications according to various aspects.

This type of communication may be considered as wireless package-to-package communications. Furthermore, the control plane may be used for facilitating board-to-board communications illustrated in FIG. 7. That is, the devices or MCMs 700 described herein can be mounted on boards, such as the boards 720, which in turn may be housed in a rack unit, such as the rack unit 780. In board-to-board communication, wireless communication may occur between the mounted devices 700 (e.g., MCMs) of different boards 720.

Figure 8:
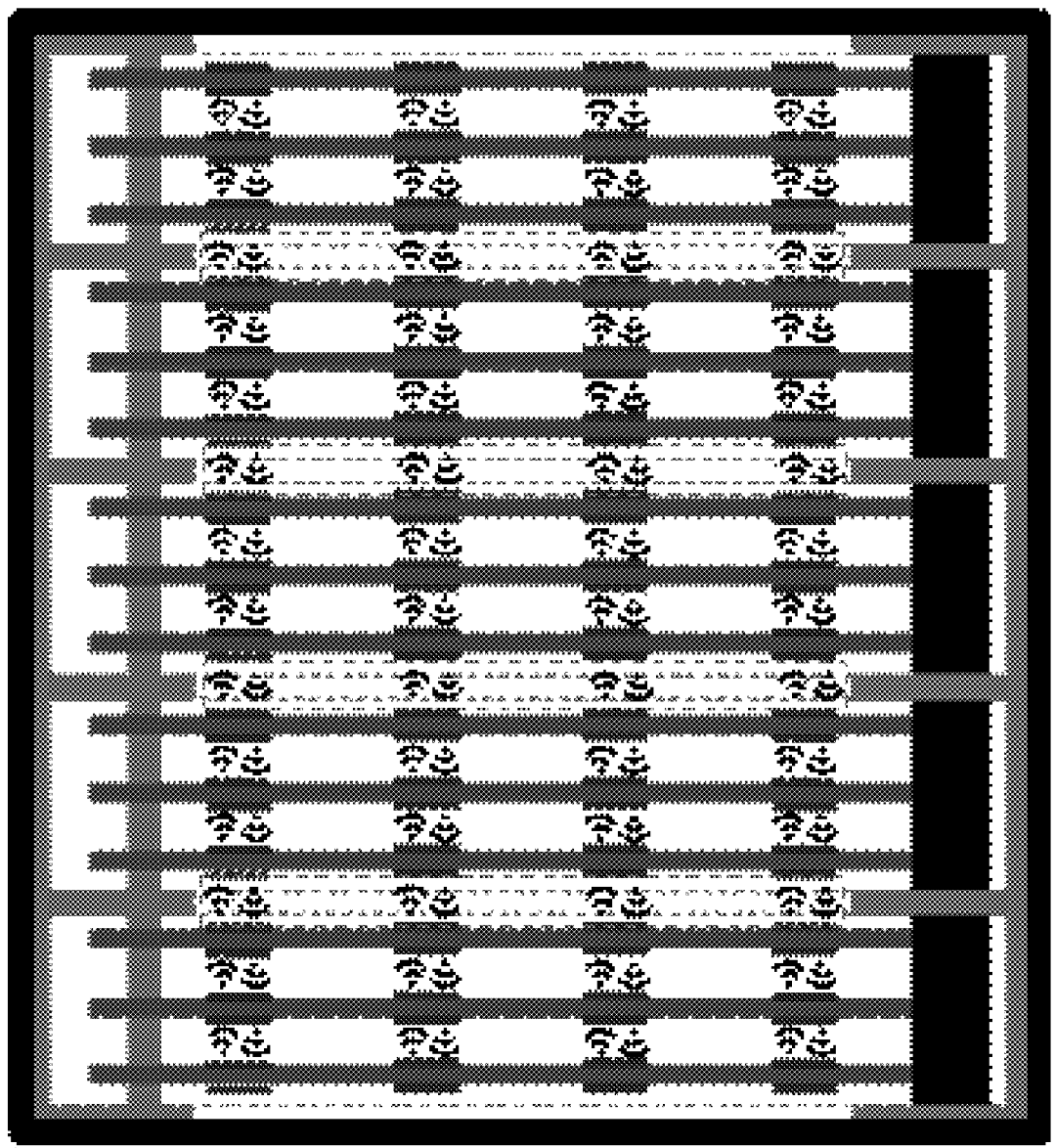
FIG. 8 exemplarily shows wireless communication extended to rack unit-to-rack unit communication.

In addition, FIG. 8 shows that wireless communication may be extended to rack-unit-to-rack-unit communication, e.g., within a chassis 810 of the rack 800.

In aspects of the present disclosure, control plane circuitry can be provided in dice of a multi-chip module and configured to provide control plane functions for wireless communication network involving devices (e.g., MCMS), dices, and packages described herein. The control plane circuitry may operate or use, as an example sub-10 GHz RF carrier technology to enable point-multipoint, broadcastable, full-duplex wireless control/manageability links for various scenarios, e.g., board-board, package-package, and chiplet-to-chiplet within a package, type communications. Control signaling may be in the form of packets reflecting any suitable type of control plane protocol. The control plane circuitry may be integrated in an application-specific manner in a module. Components of the control plane circuitry such as the transceiver circuitry or the antenna structure may be integrated or incorporated with any part of a multi-chip module described herein. Further, aspects or components of the control plane circuitry such as the antenna, connections, or waveguides, may also be included or incorporated into other components holding or involving multi-chip modules, such as boards, chassis, racks, etc.

According to aspects of the present disclosure, sub-10 GHz technology may be used for control signaling. Operation at sub-10 GHz can allow for process portability and easy adoption of the radio frequency (RF) transceiver and may use near-field couplers/antennas. The flexibility of an RF link can allow convenient placement and use within a product chassis, from rack-unit-to-rack-unit, and for 3D heterogeneously integrated semiconductor products. For example, in at least some aspects of the present disclosure, control signaling bit rates may be in the range of 0.5 Gbps to 2 Gbps over distances up to 20 cm, supporting both symmetric and asymmetric topologies. The distance may decrease with increasing frequency, e.g. for a frequency of up to about 100 GHz the distance may be in the range of about 1 cm.

Figure 9:
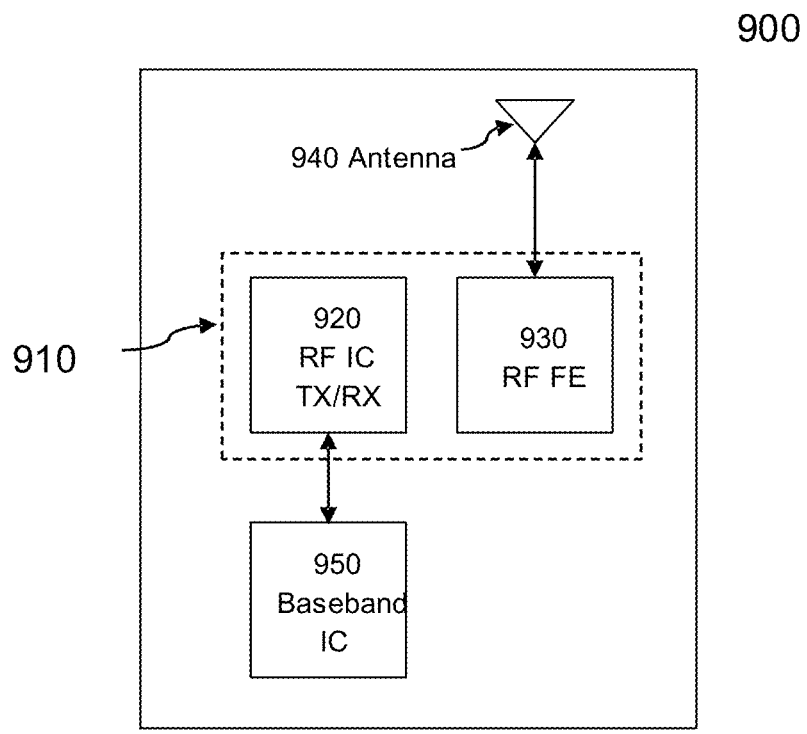
FIG. 9 exemplarily shows a block diagram showing a wireless device according to various aspects.

For the WC2C communications, both the data plane and control plane require the use of an RF circuitry. FIG. 9 shows a block diagram showing a wireless circuitry 900. The wireless circuitry 900 includes a hardware component, e.g., a baseband integrated circuit 950 for baseband signal processing, a radio circuitry 910 for radio frequency signal processing, and an antenna or antenna structure 940.

The radio circuitry 910 may include an RF integrated circuit (IC) 920 including one or more RF transceivers (TRX) and a common RF front end (FE) 930. The RF IC 920 may receive one or more data and control signals (also denoted as signal of the control plane of the Open System Interconnection (OSI) model) and operate to receive a communication signal from the baseband IC and generate an RF electrical signal from the communication signal for radio transmission from the circuitry 900 or receive an RF electrical signal and generate a communication signal from the RF electrical signal for providing to the baseband IC. The RF FE 930 may convert an RF electrical signal into a format for transmission via the antenna 940 and/or convert a signal received from the antenna 940 into an RF electrical signal for the RF IC 920.

Figure 10:
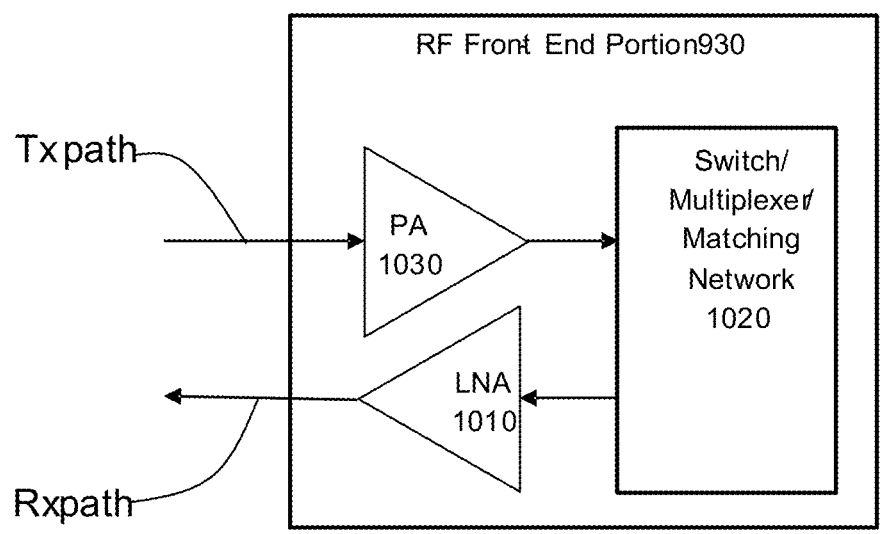
FIG. 10 exemplarily shows an example of a radio frequency (RF) front-end portion implemented in the device according to various aspects.

FIG. 10 shows an example of an RF front end portion 930 that may be implemented in the circuitry 900. A receive signal path (Rx path) of the RF front end 930 of FIG. 10 includes an LNA (low noise amplifier) 1010 for amplifying received RF signals and provides the amplified received RF signals as an output. A transmit signal path (Tx path) of the RF front end 930 of FIG. 10 includes a PA (power amplifier) 1030 for amplifying input RF signals. One or more filters may be included for generating suitable RF signals for transmission and reception. In addition, the RF front-end 930 of FIG. 10 may include other components 1020 or circuitry, such as, for example, a tuner or matching network, switches, multiplexers, and/or another circuitry for coupling the RF front end 930 to an antenna 940 as illustrated in FIG. 9. In addition, other components may be included to support both transmit and receive modes.

The RF FE 930 of at least FIG. 9 can provide signals obtained from the antenna 940 to the radio frequency integrated circuit (RFIC) 920. The transceiver chain or RFIC 920 can interface between the RF FE 930 and one or more other components.

Figure 11:
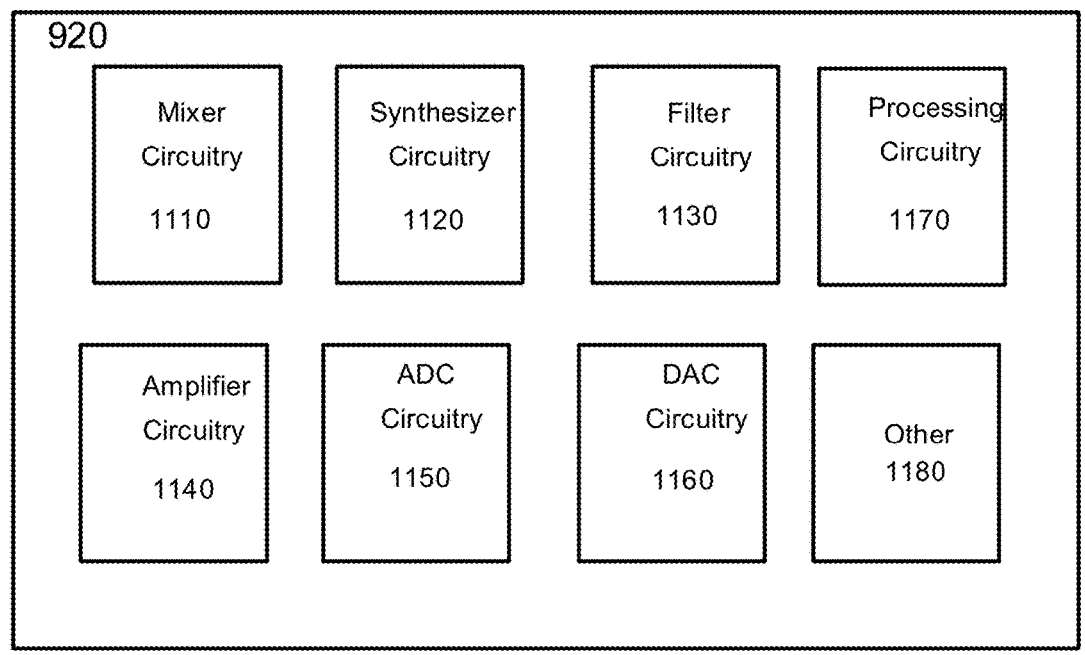
FIG. 11 exemplarily shows an example of the RF IC or transceiver circuitry according to various aspects.

FIG. 11 shows one example of the RFIC or transceiver circuitry 920. As shown, the transceiver chain/RFIC 920 can include components such as a mixer circuitry 1110, synthesizer circuitry 1120 (e.g., local oscillator), filter circuitry 1130 (e.g., baseband filter), amplifier circuitry 1140, analog-to-digital converter (ADC) circuitry 1150, digital-to-analog (DAC) circuitry 1160, processing circuitry 1170, and other suitable digital front end (DFE) components 1180, to name a few. The processing circuitry 1170 may include a processor, such as a time-domain and/or frequency domain processor(s)/components in at least one example.

The other components 1180 may include logic components, modulation/demodulation elements, and an interface circuitry for interfacing with another component.

DFE (digital front end) components 1180 may include any suitable number and/or type of components configured to perform functions known to be associated with digital front ends. This may include digital processing circuitry, portions of processing circuitry, one or more portions of an on-board chiplet having dedicated digital front-end functionality (e.g., a digital signal processor), etc. The DFE components 1180 may selectively perform specific functions based upon the operating mode of the radio circuitry 910 and, for example, may facilitate beamforming. Digital front-end components may also include other components associated with data transmission such as, for instance, transmitter impairment correction such as LO correction, DC offset correction, IQ imbalance correction, and ADC skew, digital pre-distortion (DPD) calculation, correction factor (CF) calculation, and pre-emphasis (pre. emp.) calculation. To provide additional examples, the digital front end components 1180 may facilitate or perform receiver or transmitter digital gain control (DGC), up-sampling, down-sampling, zero crossing detection algorithms, phase modulation, perform beam management, digital blocker cancellation, received signal strength indicator (RSSI) measurements, DPD and calibration accelerators, test signal generation, etc.

In at least one example, the transceiver chain (of the RF IC 920) can include a receive signal path which may include mixer circuitry 1110, amplifier circuitry 1140 and filter circuitry 1130. In some aspects, the transmit signal path of the transceiver chain 920 may include filter circuitry 1130 and mixer circuitry 1110. The transceiver chain 920 may also include synthesizer circuitry 1120 for synthesizing a frequency signal for use by the mixer circuitry 1110 of the receive signal path and the transmit signal path. In some aspects, the mixer circuitry 1110 of the receive signal path may be configured to down-convert RF signals received from the RF FE 930 based on the synthesized frequency provided by synthesizer circuitry 1120.

In some aspects, the output baseband signals and the input baseband signals may be digital baseband signals. In such aspects, the radio circuitry 910 may include analog-to-digital converter (ADC) 1150 and digital-to-analog converter (DAC) circuitry 1160.

In at least one example, the transceiver chain 920 may also include a transmit signal path (Tx path) which may include circuitry to up-convert baseband signals provided by e.g., a modem and provide RF output signals to the RF FE 930 for transmission. In some aspects, the receive signal path may include mixer circuitry 1110, amplifier circuitry 1140 and filter circuitry 1130. In some aspects, the transmit signal path of the RFIC 920 may include filter circuitry 1130 and mixer circuitry 1110. The RFIC 920 may include synthesizer circuitry 1120 for synthesizing a frequency signal for use by the mixer circuitry 1110 of the receive signal path and the transmit signal path. The mixer circuitry 1110 of the receive signal path may be configured to down-convert RF signals received from the RF FE 930 based on the synthesized frequency provided by synthesizer circuitry 1120.

In various aspects, amplifier circuitry 1140 may be configured to amplify the down-converted signals and filter circuitry may be a low-pass filter (LPF) or band-pass filter (BPF) configured to remove unwanted signals from the down-converted signals to generate output baseband signals. Output baseband signals may be provided to another component for further processing. In some aspects, the output baseband signals may be zero-frequency baseband signals, although this is not a requirement.

The mixer circuitry 1110 for a receive signal path may include passive mixers, although the scope of this disclosure is not limited in this respect. In some aspects, the mixer circuitry 1110 for a transmit signal path may be configured to up-convert input baseband signals based on the synthesized frequency provided by the synthesizer circuitry 1120 to generate RF output signals for the RF FE 930.

In some aspects, the mixer circuitry 1110 of the receive signal path and the mixer circuitry 1110 of the transmit signal path may include two or more mixers and may be arranged for quadrature down conversion and up conversion, respectively. In some aspects, the mixer circuitry 1110 of the receive signal path and the mixer circuitry 1110 of the transmit signal path may include two or more mixers and may be arranged for image rejection (e.g., Hartley image rejection). In some aspects, the mixer circuitry 1110 of the receive signal path and the mixer circuitry 1110 may be arranged for direct down conversion and direct up conversion, respectively. In some aspects, the mixer circuitry 1110 of the receive signal path and the mixer circuitry 1110 of the transmit signal path may be configured for super-heterodyne operation.

In some aspects, the synthesizer circuitry 1120 may be a fractional-N synthesizer or a fractional N/N+1 synthesizer, although the scope of the aspects is not limited in this respect as other types of frequency synthesizers may be suitable. For example, synthesizer circuitry 1120 may be a delta-sigma synthesizer, a frequency multiplier, or a synthesizer including a phase-locked loop with a frequency divider.

The synthesizer circuitry 1120 may be configured to synthesize an output frequency for use by the mixer circuitry 1110 of the radio circuitry 1120 based on a frequency input and a divider control input. In some aspects, the synthesizer circuitry 1120 may be a fractional N/N+1 synthesizer.

In some aspects, frequency input may be provided by a voltage-controlled oscillator (VCO), although that is not a requirement. In various cases, divider control input may be provided by a processing component of the RFIC 920, or may be provided by any suitable component. In some aspects, a divider control input (e.g., N) may be determined from a look-up table based on a channel indicated by external component.

In some aspects, synthesizer circuitry 1120 of the RFIC 920 may include a divider, a delay-locked loop (DLL), a multiplexer and a phase accumulator. In some aspects, the divider may be a dual modulus divider (DMD) and the phase accumulator may be a digital phase accumulator (DPA). In some aspects, the DMD may be configured to divide the input signal by either N or N+1 (e.g., based on a carry out) to provide a fractional division ratio. In some aspects, the DLL may include a set of cascaded, tunable, delay elements, a phase detector, a charge pump and a D-type flip-flop. The delay elements may be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 1120 may be configured to generate a carrier frequency as the output frequency, while in other aspects, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency may be an LO frequency (fLO). In some aspects, the RFIC 920 may include an IQ/polar converter.

Figure 12:
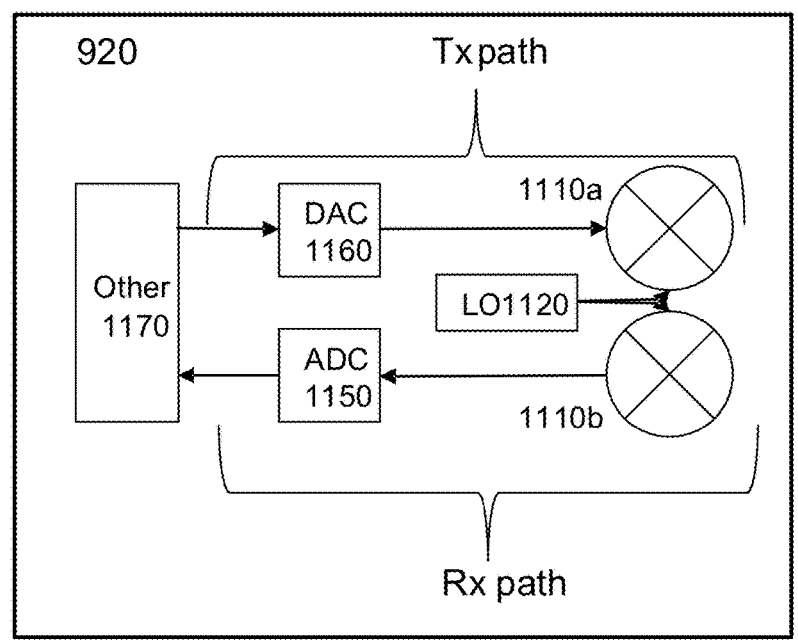
FIG. 12 exemplarily shows an example of a RF IC according to various aspects.

FIG. 12 shows one example of a transceiver chain/RFIC 920 that may be implemented. The receive signal path (Rx path) circuitry down-converts RF signals received from the RF FE 930 and provides baseband signals. Specifically, the receive signal path may include a mixer 1110*b* and an ADC 1150. The transmit signal path (Tx path) circuitry up-converts provided baseband signals and provides RF output signals to the RF front end 930 for transmission. Specifically, the transmit signal path may include a DAC 1160 and a mixer 1110*a*. The transceiver chain shown in FIG. 12 includes a synthesizer circuit, specifically, at least one local oscillator (LO) 1120 to generate reference signals for the mixers 1110*a* and 1110*b*.

The antenna 940, illustrated in FIG. 9, may include a single antenna for transmission and reception. In other cases, the antenna or antenna structure 940 may include multiple transmit antennas in the form of a transmit antenna array and multiple receive antennas in the form of a receive antenna array.

In other cases, the antenna 940 may be one or more antennas to be used as transmit and receive antennas. In such cases, the RF FE 930 may include, for example, a duplexer, to separate transmitted signals from received signals.

While the transceivers described herein include traditional super-heterodyning schemes or architectures, other type of transceiver or transmitter architectures and schemes may be used. In some aspects, the transceiver chain of the RFIC 920 may include components so as to implement a near zero IF scheme, a Direct Conversion scheme, or a digital transmission schemes, such as, for example, a Digital IQ transmission, a Digital Polar transmission, and the like.

In one example, the transceiver chain of the RFIC 920 may include a transmit path that includes or implements a direct digital transmitter (DDT). That is, in one simple example, a DDT may include a digital signal processor, a RF digital-to-analog converter (RFDAC), a RF filter/antenna coupler. Further, a DDT may be implemented with or without an IQ-mixer. In general, a RF-DAC may be included on a RFIC to convert digital input into a RF signal. A DDT may include other digital components such as numerically controlled oscillator (NCO) and digital mixers for shifting an input signal to desired frequency. The use of a DDT can reduce the number of analog components needed in the transmitter or transmit path. For example, an analog LOs, analog filters, analog mixers, and etc., may be eliminated from the RFIC when a direct digital transmitter such as DDT is employed. Further, the use of a digital transmitter or digital transmission schemes such may bring structure energy savings and efficiencies.

As already described above, inter-die data interfaces for a high-speed (data plane) interconnect between two or more chips within an MCM are a key technology in the semiconductor industry. Wireless interfaces at sub-THz frequencies are under active development and benefit from tens of GHz of bandwidth, compact antennas and tuning components, and flexible physical signaling environment. Channel equalization, required for both serial wireline and wireless interfaces, consumes a large portion of the total link power budget. Innovations to improve link efficiency through system constraints, scaled technology, improved signaling environment and circuit implementation are therefore of prime interest to the industry.

Both wireline and wireless high-speed serial interfaces may use one or more equalizers to compensate for a channel response when transmitting signals via a communication channel from one chip to another chip of the MCM communication system. The communication system may use fixed symbol rates determined as part of the overall communication system design that trades off data rate for equalizer complexity, channel characteristics, and circuit impairments. Wireless communication systems typically choose from a discrete set of rates to best meet signal to interference plus noise ratio (SINR) for particular channel conditions and usage scenarios, as in cellular and WiFi modulation and coding schemes (MCS). Wireline communication systems may also support channel-dependent rates, but more often a single rate is supported with specified worst-case channel characteristics, as in PCI-E.

A channel equalizer may use 30-50% of the total communication link power budget and may benefit from better communication channels to reduce complexity. However, in a wireline communication link with a low-pass communication channel, reducing equalizer complexity may require reducing symbol rate (and overall data rate) of the communication link. Wireless communication systems should set a carrier frequency equal to a used channel center frequency to prevent interfering with one or more adjacent channels and typically do not have freedom to adaptively make small adjustments to the channel frequency.

For a wireless chip-to-chip interface, however, these methods would fail to optimize carrier frequency and symbol rate for the channel and circuit responses. Physical layout and manufacturing tolerances may lead to variations in the channel response per implementation, and by tuning the carrier frequency to the optimum channel, equalizer complexity can be reduced while possibly simultaneously increasing data rate.

Various aspects of this disclosure may provide link power efficiency improvement by adaptively finding the optimum channel frequency band. Data rate may also be improved 5% to 10% versus a fixed interface frequency for constant equalizer complexity, because optimum channel and symbol rates are often greater than nominal. These improvements come with no added hardware in the signal or reference paths, and only require slow, low-power adaptive control logic that would converge to a static frequency adjustment parameter for static communication link conditions.

Figure 13:
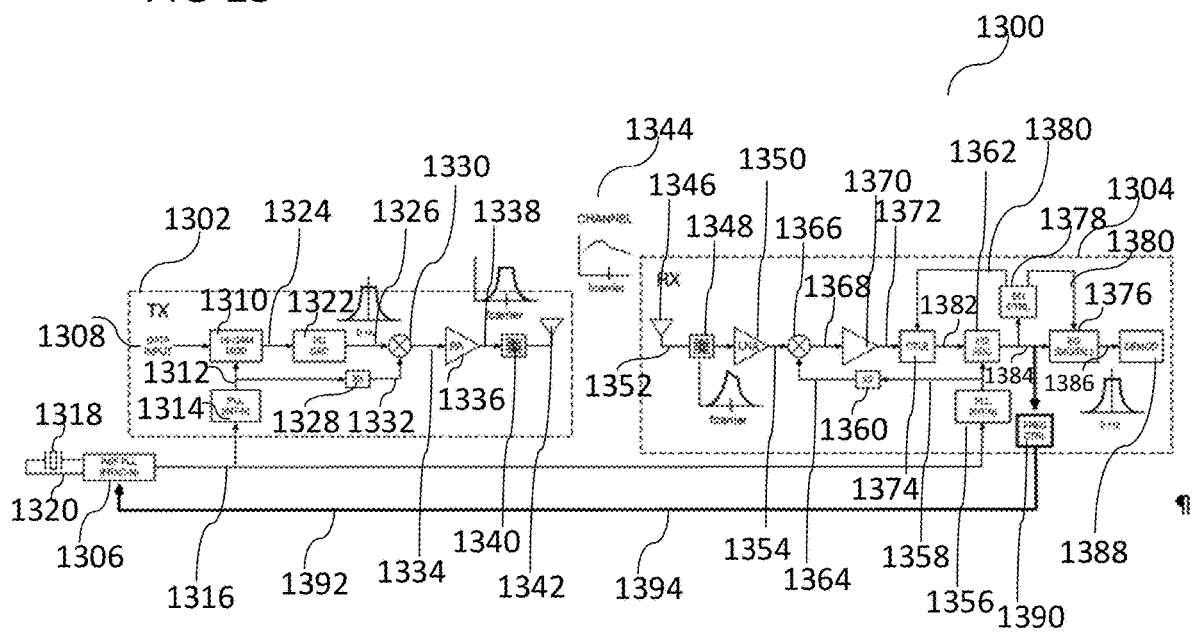
FIG. 13 exemplarily shows a portion of a communication system according to various aspects.

Therefore, a wireless chip-to-chip data interface is under development throughout the industry and academia. As shown in FIG. 13, a portion 1300 of the communication system may include at least one direct-conversion transmitter 1302-receiver 1304 pair and a shared frequency reference fractional-N PLL 1306. Analog-friendly FinFET technology makes operating at larger than 100 GHz feasible, with 30% to 40% fractional bandwidth for baud rates approaching 50 GBaud and raw data rate approaching 200 Gbit/s per communication link.

A first chip or first chiplet (such as e.g. first chiplet 410a in FIG. 4) may include a transmit path 1302 (which is an example of the transmit path of RFIC or transceiver circuitry 920 (as shown in FIG. 11) implemented in the first chiplet 410a) and an (for an exemplary direct wireless communication as shown in FIG. 4) associated sixth chip or sixth chiplet (such as e.g. sixth chiplet 410f in FIG. 4) may include a receive path 1304 (which is an example of the receive path of RFIC or transceiver circuitry 920 (as shown in FIG. 11) implemented in the sixth chiplet 410f). The transmit path 1302 of the first chiplet 410a and the receive path 1304 of the sixth chiplet 410f form an example of the above-mentioned direct-conversion transmitter 1302-receiver 1304 pair.

By way of example, the transmit path 1302 (e.g. of the first chiplet 410a) may include a data input to receive input data 1308 to be transmitted, a modulator 1310, e.g. configured to perform a 16-QAM modulation of the input data 1308. The modulator 1310 receives a symbol rate signal 1312 (providing a symbol rate to the modulator 1310) from a PLL 1314, which in turn receives a PLL reference signal 1316 (as an example of a reference signal) from the reference PLL 1306. The reference PLL 1306 is coupled to an oscillator 1318 to receive an oscillator signal 1320 therefrom. The transmit path 1302 may further include a digital-to-analog converter 1322 coupled downstream to the modulator 1310 and configured to receive a digital modulated signal 1324 and to convert the same to an analog modulated signal 1326. The transmit path 1302 may further include a multiplier (e.g. an ×3 type multiplier) 1328 and a mixer 1330. The multiplier 1328 may be configured to receive the symbol rate signal 1312, multiplies the same and provides the same as a local oscillator signal 1332 to a local oscillator input of the mixer 1330. The mixer 1330 upconverts the received analog modulated signal 1326 using the local oscillator signal 1332 as a carrier frequency signal, thereby generating an upconverted signal 1334. The transmit path 1302 may further include a power amplifier 1336 coupled to an output of the mixer 1330 and configured to receive the upconverted signal 1334, to amplify the same by a predefined amplification factor and to provide an amplified signal 1338 to an optional diplexer 1340, and via the diplexer 1340 to an antenna (e.g. a transmit antenna 1342). The antenna 1342 is configured to transmit the amplified signal 1338 e.g. via the communication link 1344 (establishing one or more transmission channels via an air interface, for example) to the sixth chiplet 410f. The antenna 1342 may be part of the transmit path 1302. Alternatively, the antenna 1342 may be a separate component external to the transmit path 1302.

Furthermore, the receive path 1304 (e.g. of the sixth chiplet 410f) may include an antenna (e.g. a receive antenna 1346) configured to receive the amplified signal 1338 transmitted from the antenna 1342. The antenna 1346 may be part of the receive path 1304. Alternatively, the antenna 1346 may be a separate component external to the receive path 1304. A receive power amplifier (e.g. a low noise amplifier, LNA) 1350 is coupled downstream to the receive antenna 1346, e.g. via a diplexer 1348, to receive a received signal 1352 and configured to amplify the same, thereby generating an amplified received signal 1354. The receive path 1304 may further include a further PLL 1356 coupled to the reference PLL 1306 and configured to receive the PLL reference signal 1316 (as an example of a reference signal)

from the reference PLL 1306. The further PLL 1356 may provide a further PLL signal 1358 and supplies the same to a further multiplier (e.g. an ×3 type multiplier) 1360 and to an analog-to-digital converter 1362. The further multiplier 1360 may multiply the received further PLL signal 1358 with a predefined factor, thereby generating a second local oscillation signal 1364. The receive path 1304 may further include a mixer 1366 coupled downstream to the LNA 1350 and configured to receive the amplified received signal 1354 and the second local oscillation signal 1364. The mixer 1366 may down-convert the amplified received signal 1354 using the second local oscillation signal 1364, thereby generating a down-converted signal 1368. Optionally, a further amplifier 1370 may be coupled downstream to an output of the mixer 1366 to receive and amplify the down-converted signal 1368, thereby generating an amplified down-converted signal 1372. Furthermore, as will be described in more detail below, the receive path 1304 may further include an analog equalizer 1374 and/or a digital equalizer 1376. The receive path 1304 may further include an equalizer controller 1378 coupled to the analog equalizer 1374 and/or the digital equalizer 1376 to control the operation thereof using equalizer control signals 1380 supplied to the analog equalizer 1374 and/or the digital equalizer 1376. The analog equalizer 1374 may be configured to receive amplified down-converted signal 1372 and to perform an equalizing with the amplified down-converted signal 1372 in accordance with the received equalizer control signals 1380. Correspondingly generated analog equalized signals 1382 may be supplied to the analog-to-digital converter 1362. The analog-to-digital converter 1362 converts the received analog equalized signals 1382 (or in case no analog equalizer 1374 is provided the amplified down-converted signal 1372) to a digital signal using the further PLL signal 1358 as a clock signal, thereby generating digital equalized signals 1384 (or digital amplified down-converted signals). The digital equalizer 1376 may be configured to receive the digital equalized signals 1384 or the digital amplified down-converted signals and to perform an equalizing with the digital equalized signals 1384 or the digital amplified down-converted signals in accordance with the received equalizer control signals 1380, thereby generating yet further digital equalized signals 1386. The receive path 1304 may further include a demodulator 1388 coupled downstream to an output of the digital equalizer 1376 (if present, or otherwise, to an output of the analog-to-digital converter 1362). The demodulator 1388 may demodulate the further digital equalized signals 1386 (or the digital equalized signals 1384) to generate a demodulated bit stream for further processing, e.g. by a baseband processor (not shown).

Furthermore, communication system (e.g. within an MCM) includes a feedback loop, which includes a frequency controller 1390 coupled downstream to an output of the analog-to-digital converter 1362 and configured to receive the digital equalized signals 1384 or the digital amplified down-converted signals and to generate a frequency adjust control signal 1392 and to supply the same to the reference PLL 1306 via a feedback connection 1394 between an output of the frequency controller 1390 and a control input of the reference PLL 1306. The frequency adjust control signal 1392 controls an adjusting of the frequency of the PLL reference signal 1316 at the reference PLL 1306, as will be explained in more detail below.

Thus, illustratively, various aspects of this disclosure provide a feedback loop from the receiver of one chiplet to the transmitter of another chiplet to control (adjust) the frequency of the oscillator signal, in more detail, to control a reference PLL (e.g. reference PLL 1306) shared by the receiver of one chiplet to the transmitter of another chiplet, in other words by a transmitter-receiver-pair of two chiplets wirelessly communicating with each other, e.g. within an MCM. It is to be noted that an MCM may have an arbitrary number of transmitter-receiver-pairs of two or more respective chiplets, e.g. two, three, four, five or even more pairs.

The shared reference PLL (e.g. reference PLL 1306), either using a crystal (oscillator) or another clock in the communication system, produces a common frequency reference signal. The reference PLL (e.g. reference PLL 1306) may use a fractional multiplication ratio. Local integer-N PLLs (e.g. PLL 1314 at the TX 1302 and PLL 1356 at the RX 1304) produce the symbol rate clock and the carrier rate local oscillator (LO) signal (e.g. the local oscillator signal 1332 and the second local oscillation signal 1364). For example, in this communication system for a carrier frequency of 140 GHz, the data clock would be 46.67 GHz and the reference signal would have a frequency of 4.667 GHz, such that the local PLLs (e.g. PLL 1314 at the TX 1302 and PLL 1356 at the RX 1304) may use a 10× multiplication ratio.

The communication system may use complex I/Q baseband channels and may support an asymmetric spectrum at RF. Passband ripple may induce ISI as described above and may include the cascaded frequency response of TX/RX circuits, matching networks, antennas, channel and multipath effects. Sketches of the spectrum are shown at various points in the chain in FIG. 13. Equalizers (e.g. 1374, 1376) at the receiver 1304 may be continuous time (CT) and/or discrete time (DT) equalizers. Equalizer control logic (such as e.g. equalizer controller 1378) may adaptively drive filter parameters to minimize RX 1304 EVM.

Figure 14:
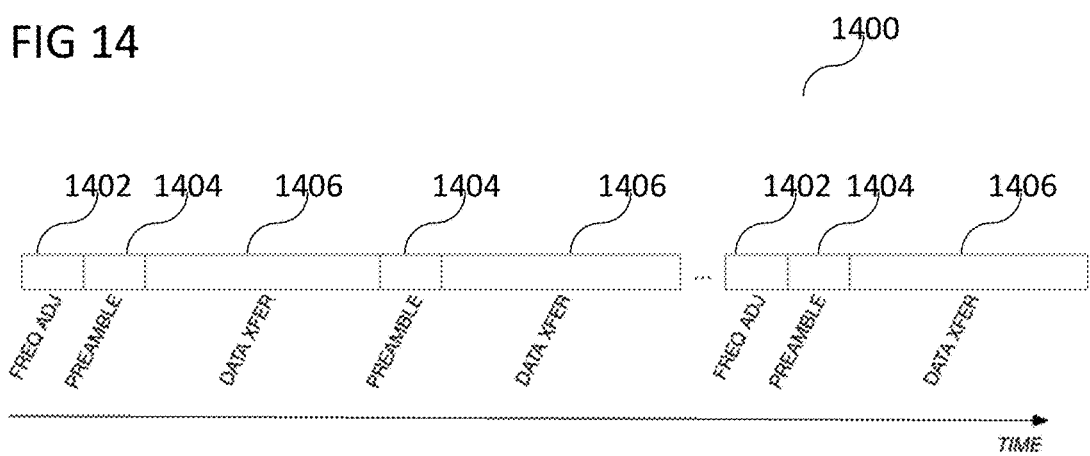
FIG. 14 exemplarily shows a timing diagram illustrating a timing of frequency adjustment according to various aspects.

Various aspects add a control loop (also referred to as feedback loop 1390, 1394 and shown in FIG. 1) that adjusts the reference PLL frequency within a predetermined range based on ADC (or slicer) data to minimize EVM. As shown in a timing diagram 1400 in FIG. 14, frequency adjustment 1402 may be scheduled during communication system startup, during or before frame preamble 1404 as shown in FIG. 14, or run as a slow continuous adjustment during the frame preamble 1404. The timing diagram 1400 further shows data transfer time slots 1406. The frequency controller 1390 may use or implement least-mean-square (LMS) or other adaptive algorithms to determine the direction and magnitude of change in the programmed frequency word to the reference PLL 1306. Illustratively, FIG. 14 shows a data transmission framing and frequency adjustment scheduling.

Figure 15:
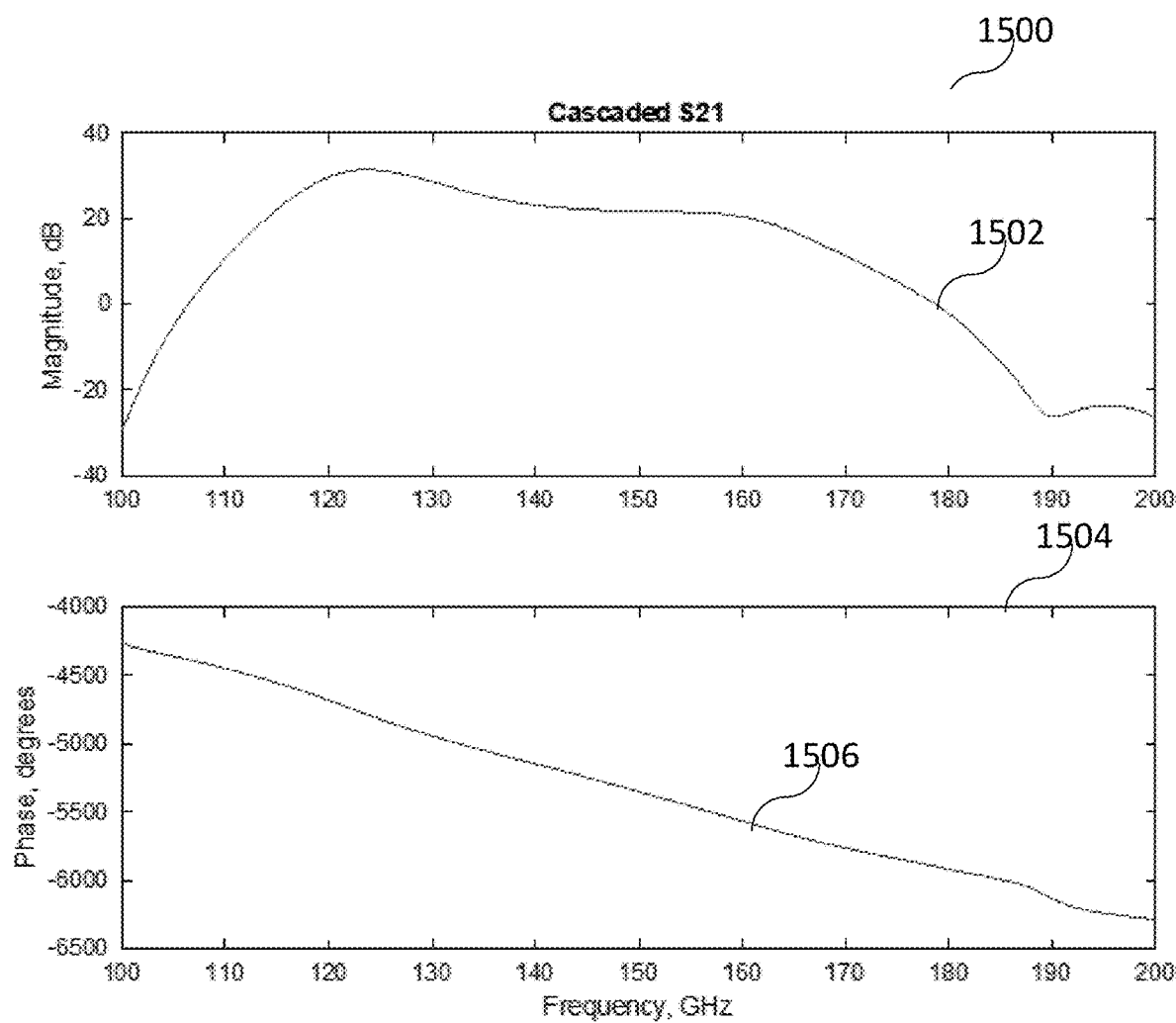
FIG. 15 exemplarily shows a cascaded response illustrating a magnitude characteristic in a magnitude diagram and a phase characteristic in a phase diagram according to various aspects.

For an exemplary communication system, a cascaded response (illustrating a magnitude characteristic 1502 in a magnitude diagram 1500 and a phase characteristic 1506 in a phase diagram 1504) including TX (e.g. 1302)/RX (e.g. 1304) circuits, antennas, routing and channel is shown in FIG. 15. This response has notably less ripple than wireline channels primarily due transformer output matching that eliminates the need for electrostatic discharge (ESD) pads, which add parasitic capacitance that causes mismatch beyond certain frequency. The channel also lacks effects of vias and connectors that may be present in longer range wireline serializers/deserializers (SERDES) and create sharp nulls in the response.

Figure 16:
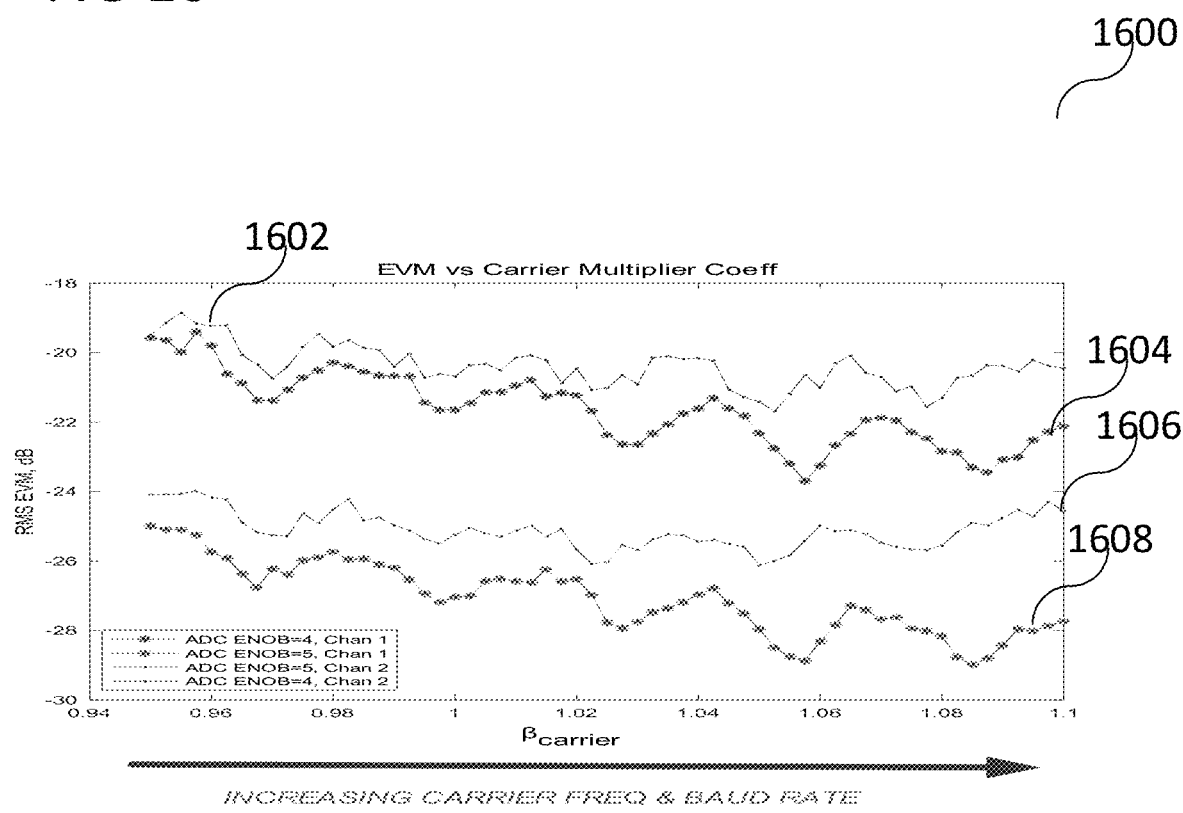
FIG. 16 exemplarily shows a diagram illustrating error vector magnitude (EVM) versus carrier frequency multiplier in a wireless chip-to-chip communication system according to various aspects.

A bandwidth limitation usually exists that spreads the impulse response to overlap with neighboring symbols and cause ISI. The characteristics 1602, 1604, 1606, 1608 in a diagram 1600 in FIG. 16 show the EVM vs. carrier frequency multiplier (in a wireless chip-to-chip communication system), $\beta_{carrier}$, such that $\beta_{carrier}$ is "1" for a tuned center frequency of a channel and circuit responses. Chan1 and Chan2 in the diagram 1600 are similar physical channels but differ in voltage standing wave ratio (VSWR) and parasitic corners. Symbol frequency and carrier frequency are phased-locked to be an integer ratio of each other, as is most likely the case for phase noise correlation and hardware simplicity.

Figure 17:
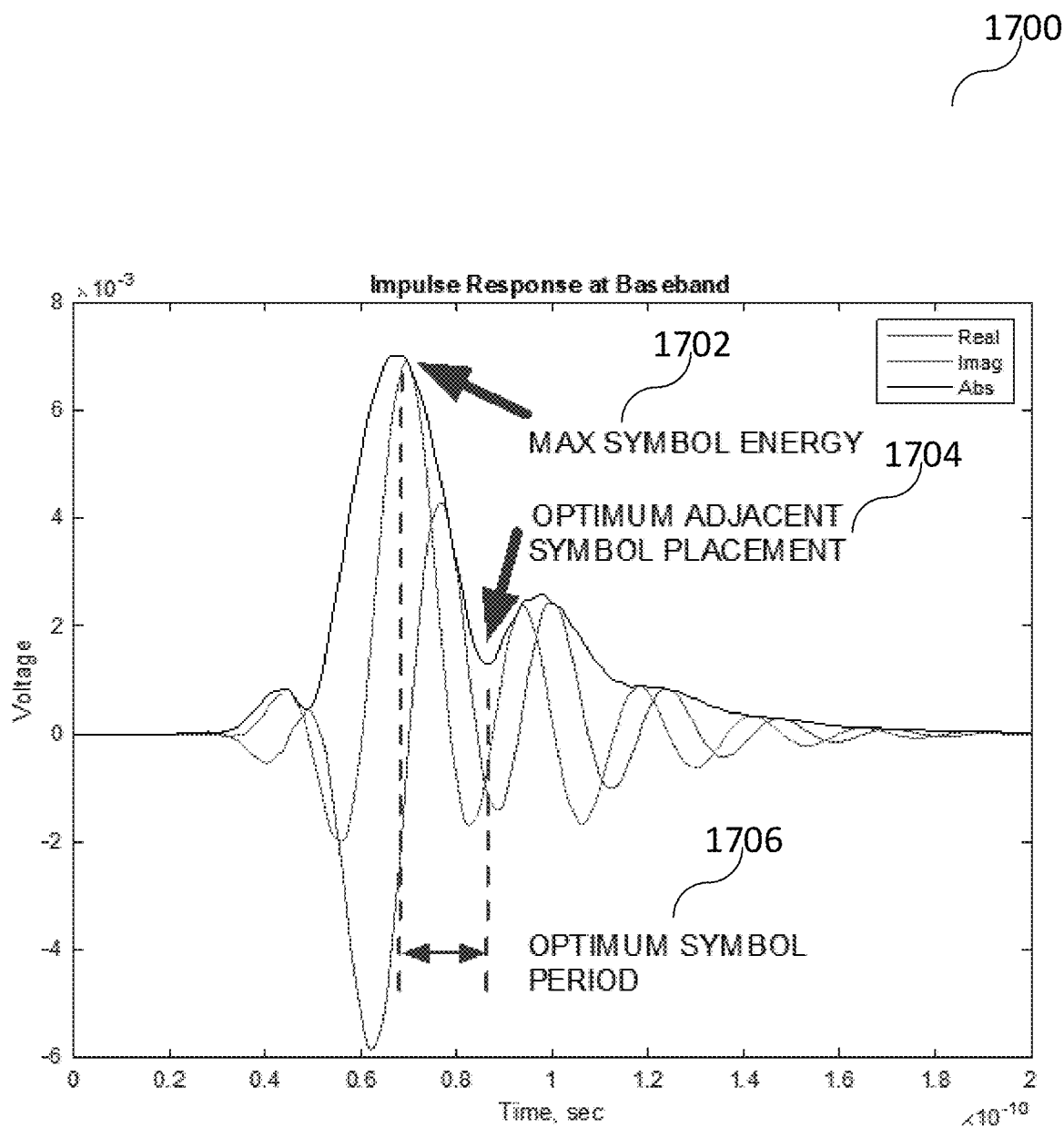
FIG. 17 exemplarily shows a diagram illustrating a baseband referred example cascaded channel and circuit impulse response for a wireless chip-to-chip interface communication system according to various aspects.

FIG. 17 shows a diagram 1700 illustrating that EVM minima occur at different carrier/symbol frequencies for the two channels, and that a static carrier/symbol frequency would cost as much as 3 dB EVM versus the optimum carrier frequency obtained with closed-loop tracking, where the channel response has been detuned due to dynamic loading or parasitic changes over temperature, for example. The diagram 1700 also shows that better EVM can occur at greater carrier frequency and baud rate, and that tuning for the EVM minima simultaneously provides for a simpler equalizer and greater data transfer rate. In more detail, diagram 1700 illustrates a maximum symbol energy 1702, an optimum adjacent symbol placement 1704 and a correspondingly resulting optimum symbol period 1706.

The impulse response in FIG. 17 shows the mechanism behind EVM minima over carrier frequency. Optimum symbol period 1706 based on the placement of the adjacent symbol at the location of minimum power in the current symbol's impulse response.

In the communication system including a shared reference signal as shown in FIG. 13, change to the reference PLL frequency modifies both the carrier frequency and the symbol rate. The reference PLL 1306 may be a fractional-N (frac-N) PLL 1306 capable of tuning the frequency of the reference PLL signal on the order of single parts per million.

The general requirement of the frequency controller (e.g. frequency controller 1390) is to minimize ISI based on comparing a received baseband signal to a reference signal and can run during a startup calibration period or during data transmission. The comparison can be performed in either the analog domain or the digital domain, depending on the equalizer implementation. An adaptive gradient descent algorithm like LMS can be used as outlined above to minimize mean square error in the received sample by updating the reference PLL frequency parameter. A normalized version of the LMS is given by $$w(n+1) = w(n) + \frac{\mu \varepsilon(n) x(n)}{x^H(n) x(n)}, \quad (1)$$

where w(n) is the scalar weight at time n, μ is the step size, ε(n) is the error at time n, and x(n) is the received data at time n.

A frequency word, pf can be calculated as $$p_f(n+1) = p_{f0} + \left| \frac{1}{w(n+1)} \right|. \quad (2)$$

where $p_{f0}$ is an offset on the PLL frequency word.

Other methods, such as directly measuring the impulse response curve and using feature detection to find the minima may be used in alternative aspects of this disclosure.

The proposed tuning scheme does not demand additional signal path or PLL capability. The frequency controller 1390 may run at low speed and draw little power.

In various aspects a receiver of a communication system may implement a method 1800 as shown in a flow diagram in FIG. 18. The method 1800 may include, in 1802, down-converting a received communication signal at a predefined carrier frequency, with a reference signal received from a reference signal generator, and, in 1804, performing a signal quality detection to identify a signal quality metric of the received communication signal at the predefined carrier frequency, and, in 1806, providing a frequency adjusting signal to the reference signal generator to change the frequency of the reference signal based on the performed signal quality detection to identify the signal quality metric of the received communication signal at the predefined carrier frequency.

Various aspects of this disclosure may provide a closed-loop carrier frequency and/or baud rate tuning to mitigate ISI in a wireless interface to reduce equalizer power, increase data rate, and/or improve reliability for dynamic channel conditions, where channel and circuit parameters change due to changes in environmental factors and/or electrical loading.

Various aspects of this disclosure may provide an application of LMS or other adaptive algorithms to minimize error against reference symbols, or blind adaptation to minimize error against ideal constellation points.

Various aspects of this disclosure may provide a frequency stepping performed during startup calibration period, frame preambles, or as a continuous adjustment.

Various aspects of this disclosure may provide direct measurement of symbol impulse response to drive carrier frequency and/or baud rate adjustment for ISI mitigation.

In the following, various aspects of this disclosure will be illustrated:

Example 1 is a receiver. The receiver may include a down-converter configured to down-convert a received communication signal at a predefined carrier frequency, with a reference signal received from a reference signal generator, and a processor configured to perform a signal quality detection to identify a signal quality metric of the received communication signal at the predefined carrier frequency, and to provide a frequency adjusting signal to the reference signal generator to change the frequency of the reference signal based on the performed signal quality detection to identify the signal quality metric of the received communication signal at the predefined carrier frequency.

In Example 2, the subject matter of Example 1 can optionally include that the processor is configured to generate the frequency adjusting signal based on the performed signal quality detection to identify the signal quality metric of the received communication signal at the predefined carrier frequency.

In Example 3, the subject matter of any one of Examples 1 or 2 can optionally include that the processor is configured to provide the frequency adjusting signal including an information related to an adjustment of the frequency of the reference signal within a predetermined frequency range.

In Example 4, the subject matter of any one of Examples 1 to 3 can optionally include that the processor is configured to estimate the at least one of an adjusted carrier frequency or an adjusted symbol rate based on the performed signal quality detection, and to generate the frequency adjusting signal including an information related to the adjustment of the reference signal based on the at least one of the adjusted carrier frequency or the adjusted symbol rate.

In Example 5, the subject matter of any one of Examples 1 to 4 can optionally include that the processor is configured to calculate an error vector magnitude (EVM) of at least one symbol of the received communication signal at the predefined carrier frequency, and to estimate the at least one of an adjusted carrier frequency or the adjusted symbol rate to decrease the error vector magnitude for at least one future symbol to be received with the communication signal at the at least one of the adjusted carrier frequency or the adjusted symbol rate.

In Example 6, the subject matter of any one of Examples 1 to 5 can optionally include that the processor is configured to calculate an eye opening for a first portion of the received communication signal at the predefined carrier frequency, and to estimate the at least one of adjusted carrier frequency or adjusted symbol rate to increase the eye opening for a second portion of the communication signal to be received at the at least one of adjusted carrier frequency or adjusted symbol rate.

In Example 7, the subject matter of any one of Examples 5 or 6 can optionally include that the processor is configured to estimate the at least one of adjusted carrier frequency or adjusted symbol rate based on a least mean square algorithm.

In Example 8, the subject matter of Example 7 can optionally include that the processor is configured to provide an indication to at least one of the down-converter to down-convert signals at the adjusted carrier frequency or a demodulator to demodulate digital signals at the adjusted symbol rate.

In Example 9, the subject matter of any one of Examples 1 to 8 can optionally include that a ratio of the adjusted carrier frequency and the adjusted symbol rate is an integer.

In Example 10, the subject matter of any one of Examples 1 to 9 can optionally include that the processor is configured to detect a portion of the received wireless communication signal including a plurality predetermined symbols and perform the signal quality detection to identify the signal quality metric of the received communication signal at the predefined carrier frequency using the detected portion of the received wireless communication signal.

In Example 11, the subject matter of any one of Examples 1 to 10 can optionally include that the receiver is configured to receive wireless signal in a wireless connection with one or more chips within a common chip package.

In Example 12, the subject matter of any one of Examples 1 to 11 can optionally include that the predefined carrier frequency is generated by the reference signal generator for a transmitter to transmit the communication signal received by the receiver.

Example 13 is a reference signal generator. The reference signal generator may include an oscillator to generate a first reference signal at a predefined carrier frequency to be provided to a transmitter and a receiver, and a processor configured to receive a frequency adjusting signal from the receiver, and to adjust the first reference signal based on the frequency adjusting signal to generate a second reference signal.

In Example 14, the subject matter of Example 13 can optionally include that the reference signal generator includes a frequency multiplier to multiply a generator-internal signal at a first frequency by a multiplication factor to obtain the reference signal, and the processor is configured to adjust the multiplication factor or to adjust the predefined carrier frequency based on the frequency adjusting signal to generate the second reference signal at the adjusted carrier frequency.

Example 15 is a communication system. The communication system may include a receiver, including a down-converter configured to down-convert a received communication signal at a predefined carrier frequency, with a reference signal received from a reference signal generator, and a processor configured to perform a signal quality detection to identify a signal quality metric of the received communication signal at the predefined carrier frequency, and to provide a frequency adjusting signal to the reference signal generator to change the frequency of the reference signal based on the performed signal quality detection to identify the signal quality metric of the received communication signal at the predefined carrier frequency. The communication system may further include the reference signal generator including at least one oscillator configured to generate the reference signal at the predefined carrier frequency, and the processor configured to adjust the frequency of the reference signal based on the frequency adjusting signal received from the receiver.

In Example 16, the subject matter of Example 15 can optionally include that the communication system further includes a transmitter configured to receive the reference signal from the reference signal generator, to modulate a signal to be transmitted using the reference signal to obtain a communication signal, and to transmit the communication signal at the predefined carrier frequency.

In Example 17, the subject matter of Example 16 can optionally include that the reference signal generator is coupled to the transmitter and the receiver via a first communication medium to provide the reference signal, and that the transmitter is configured to transmit the communication signal via a second communication medium.

In Example 18, the subject matter of any one of Examples 13 to 17 can optionally include that the communication system further includes encapsulating material encapsulating the receiver and the reference signal generator.

In Example 19, the subject matter of any one of Examples 13 to 18 can optionally include that the communication system may further include a further receiver, including a down-converter configured to down-convert a received further communication signal at a predefined further carrier frequency, with a further reference signal received from a further reference signal generator, and a processor configured to perform a further signal quality detection to identify a further signal quality metric of the received further communication signal at the predefined further carrier frequency, and to provide a further frequency adjusting signal to the further reference signal generator to change the frequency of the further reference signal based on the performed further signal quality detection to identify the further signal quality metric of the received further communication signal at the predefined further carrier frequency. The communication system may further include the further reference signal generator including an oscillator configured to generate the further reference signal at the predefined further carrier frequency, and the processor configured to adjust the further frequency of the further reference signal based on the further frequency adjusting signal received from the further receiver.

Example 20 is a non-transitory computer readable medium. The non-transitory computer readable medium may include instructions stored thereon, that if executed, cause a processor to perform a signal quality detection to identify a signal quality metric of a received communication signal at a predefined carrier frequency, and to provide a frequency adjusting signal to a reference signal generator to change the frequency of the reference signal based on the performed signal quality detection to identify the at least one signal quality metric of the received communication signal at the predefined carrier frequency.

Example 21 is a receiving means. The receiving means may include down-converting means for down-converting a received communication signal at a predefined carrier frequency, with a reference signal received from a reference signal generator, signal quality detection means for identifying a signal quality metric of the received communication signal at the predefined carrier frequency, and frequency adjusting signal provision means for providing a frequency adjusting signal to the reference signal generator to change the frequency of the reference signal based on the performed signal quality detection to identify the signal quality metric of the received communication signal at the predefined carrier frequency.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

Today's emerging technologies and application continue to increasingly demand or require greater computational power. Traditionally, increased computational or performance requirement could be met as a result of packing more number of transistors into a unit die area.

However, physical limits resulting from device physics and space or real estate constraints in an integrated circuit caused, for example, by the space consumed by the metal interconnects, which are required to couple the transistors or logic gates may limit the number of transistors, that can be packed into an unit die area. At the same time as the technologies involving artificial intelligence, machine learning, neuromorphic computing, data servers, cloud computing demands are greater with respect to computational performance. One approach to meet today's ever-increasing computational demand has been the integration of disaggregated resources in a single package or module. In some cases, the disaggregated resources may be a hardware component in the form of a chip (in various aspects a chip may be denoted as a chiplet). A chiplet can be a functional block in the form an integrated circuit that can be specifically designed to work with other chiplets to form larger more complex chips. That is, chiplets can refer to the independent constituents which make up a large chip built out of multiple smaller chiplets or dice. Chiplet(s) may be provided with or without encapsulating material packaging the chiplet(s).

Devices described herein can be in the form of a multi-chip module. Multi-chip modules described herein be an electronic assembly where multiple chiplets and/or other discrete components are integrated so that in operation, the multiple chiplets can be treated as if they were a larger integrated circuit. The integration of disaggregated resources by way of integrating chiplets in a module may effectively bypass the limits discussed above and provide the computational power needed for today's applications.

However, the integration of disaggregated resource poses many challenges in terms of realizing performance improvement, cost efficiency, and design flexibility. For example, the connections between the chiplets or other functional blocks in a module can provide difficulties and challenges.

To meet the computational demands for today's application, chips or modules that include any integrated multiple disaggregated resources are used. One way to increase the performance or power of a processor is to increase the number of computational elements or transistors on a processor. Though the size of transistors has shrunk, the number of transistors that can be packed into a unit die area has not increased proportionately due to the real estate constraints of the die. One alternative to boost performance has been the use of chips or chiplets.

As used herein, the term "chiplet" includes an integrated circuit block of a multi-chip module (MCM) or MCM devices. A chiplet can be considered as typically a sub processing unit or a disaggregated functional resource with a specialized function that is designed to integrate with other chiplets of a same multi-chip device or module. A chiplet may be fabricated on its own individual semiconductor die with physical dimensions that are often smaller than other chips or processors. The MCM provides interconnections of the chiplets so as to form complete electronic function(s).

In aspects of the disclosure, where appropriate, the term "die" may refer to a block of semiconductor material on which a component, e.g., a chip or chiplet is fabricated. In appropriate cases the term "die" may be used to refer to the integrated circuit fabricated from the semiconductor material (e.g., a chip, chiplet, etc.) and vice versa.

A multi-chip module or MCM can be an electronic assembly that may be a single package including multiple components. In examples herein, an MCM can be a plurality of chiplets arranged in a single package including die-to-die interconnect schemes for connecting the chiplets. In such cases, the chiplets of an MCM can be integrated and mounted onto a unifying carrier, so that in use it can be treated as if it were a larger IC. The unifying carrier may be the package carrier or package carrier. The chiplets (and possibly other components) of the MCM may also share a common encapsulation and a common integrated head spreader (IHS).

An MCM may in some cases include components other than chiplets. That is, an MCM may include integrated devices that have with their own packaging, such as, for example, Central Processing Units (CPUs), Graphical Processing Units (GPUs), Field Programmable Gate Array (FPGA), etc. Such components with their own packaging can be arranged on a common carrier or base layer (also denoted as package carrier or board) within in relatively close proximity to each other in the MCM.

As used herein, "racks" or "rack enclosures" may be any type of equipment for housing electronic equipment. Racks house multiple types or sets of electronic equipment with an individual set of electronic equipment being housed within a single rack unit of the rack. Rack units of a rack may be stacked close together, e.g., vertically in some cases. In aspects of the present disclosure, a rack unit may contain or hold one or more circuit boards or simply "boards". Each board can include a plurality of electronic devices, e.g., one or more multi-chip devices mounted the board. A rack may include multiple rack units in enclosed or contained in a common frame structure or chassis.

The EVM (sometimes also called relative constellation error or RCE) is a measure used to quantify the performance of a digital radio transmitter or receiver. A radio signal sent by an ideal transmitter or received by a receiver would have all constellation points precisely at the ideal locations, however various imperfections in the implementation (such as carrier leakage, low image rejection ratio, phase noise etc.) cause the actual constellation points to deviate from the ideal locations. Illustratively, EVM is a measure of how far the points are from the ideal locations.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring structure to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring structure to a subset of a set that contains less elements than the set.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The term "semiconductor carrier" is defined to mean any construction including semiconductor material, for example, a silicon carrier with or without an epitaxial layer, a silicon-on-insulator carrier containing a buried insulator layer, or a carrier with a silicon germanium layer. The term "integrated circuits" as used herein refers to electronic circuits having multiple individual circuit elements, such as transistors, diodes, resistors, capacitors, inductors, and other active and passive semiconductor devices.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

As used herein, a signal that is "indicative of" a value or other information may be a digital or analog signal that encodes or otherwise communicates the value or other information in a manner that can be decoded by and/or cause a responsive action in a component receiving the signal. The signal may be stored or buffered in computer readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring structure to the transmit signal in baseband, intermediate, and radio frequencies.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As utilized herein, terms "module", "component," "system," "circuit," "element," "slice," "circuitry," and the like are intended to refer to a set of one or more electronic components, a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more."

As used herein, "memory" is understood as a computer-readable medium (e.g., a non-transitory computer-readable medium) in which data or information can be stored for retrieval. References to "memory" included herein may thus be understood as referring structure to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

The term "antenna" or "antenna structure", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

The term "calibration" as used herein may describe a process in which a device or a component of a device (e.g., a radiohead circuit, a transceiver chain, a component of a transceiver chain, and the like) is calibrated. Illustratively, the term calibration may describe a process in which one or more deviations of a behavior of a device or of one of its components from an expected or desired behavior are corrected. Further illustratively, the term calibration may describe a process in which the operation of a device or of one of its components is aligned with a predefined or desired operation of the device or of the component. By way of example, a calibration may describe a process in which nonlinearities are eliminated and/or in which mismatches are eliminated.

One or more antennas are configured to operate within a plurality of radiofrequency bands; one or more antennas that are each configured to operate within a single radiofrequency band; or a combination thereof. According to one aspect of the disclosure, the antenna or antennas of the radiofrequency device disclosed herein may be configured to operate within radiofrequency bands between 2.4 GHz and 100 GHz. This may include, for example, 2.4 GHz, 5 to 6 GHz, 6 to 7 GHz, or any combination thereof.

Each of the multiple RF FE circuitries may be configured to communicate via the respective multifeed antenna terminal, e.g., by transmitting and/or receiving an analog signal within a respective component carrier frequency range (also referred to as frequency block or as communication channel) via the multifeed antenna terminal. In RF communication, the available frequency spectrum may be divided into multiple bands, wherein each band may be subdivided into multiple frequency blocks (also referred to as sub-band), which may not overlap each other. For example, the 802.11 standard may provide several distinct radio frequency bands for use in Wi-Fi communications, for example, a so called 900 MHz band, a 2.4 GHz band, a 3.6 GHz band, a 4.9 GHz band, a 5 GHz band, a 5.9 GHz band and the like (denoted according to the lower frequency limit).

A communication channel may have a certain capacity for transmitting information, often measured by its bandwidth (also referred to as channel bandwidth) in hertz (Hz) or its data rate in bits per second. The bandwidth (BW) is the continuous band of frequencies occupied by a modulated carrier signal and denotes the difference between the upper frequency limit and lower frequency limit of the communication channel. The maximum possible data rate per user is increased the more communication channels are assigned to the wireless mobile device, e.g., a respective communication conducted by the wireless mobile device (e.g., on software-level).

Some examples may be used in various wireless communication devices, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a hybrid device, a vehicular device, a non-vehicular device, a wireless communication station, a wireless Access Point (AP), a wireless router, a wireless modem, a video device, an audio device, an audio-video (A/V) device.

Some examples may be used for "peer to peer (PTP) communication", which may relate to device-to-device communication over a wireless link ("peer-to-peer link") between devices. The PTP communication may include, for example, a Wi-Fi Direct (WFD) communication, e.g., a WFD Peer to Peer (P2P) communication, wireless communication over a direct link within a Quality of Service (QoS) basic service set (BSS), a tunneled direct-link setup (TDLS) link, a STA-to-STA communication in an independent basic service set (IBSS), a Wi-Fi Aware communication, a Vehicle-to-Anything (V2X) communication, an IoT communication, or the like. Other aspects may be implemented for any other additional or alternative communication scheme and/or technology.

Some examples may be used in devices operating in accordance with existing IEEE 802.11 standards (including IEEE 802.11-2016 (IEEE 802.11-2016, IEEE Standard for Information technology—Telecommunications and information exchange between systems local and metropolitan area networks—Specific requirements Part 11: Wireless LAN Medium Access Control (MAC) and Physical Layer (PHY) Specifications, Dec. 7, 2016)), and/or future versions and/or derivatives thereof (e.g., wireless local area network stations (WLAN STAs) or WiFi stations (WiFi STAs)), including any device that contains an IEEE 802.11-conformant media access control (MAC) and physical layer (PHY) interface to the wireless medium (WM).

Some examples may be used in conjunction with a WLAN, e.g., a WiFi network. Other aspects may be used in conjunction with any other suitable wireless communication network, for example, a wireless area network, a "piconet", a WPAN, a WVAN and the like.

Some examples may be used in conjunction with a wireless communication network communicating over a frequency band of 2.4 GHz, 5 GHz, and/or 6-7 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

Some examples may be used in devices operating in accordance with existing cellular specifications and/or protocols, e.g., 3rd Generation Partnership Project (3GPP) Long Term Evolution (LTE), 3GPP 5G, and/or future versions and/or derivatives thereof, units and/or devices which are part of the above networks, and the like.

Some examples may be used for one way and/or two-way radio communication systems, cellular radio-telephone communication systems, a cellular telephone, a WLAN telephone, a Personal Communication Systems (PCS) device, a device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some examples may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), Time-Division Multiplexing (TDM), Time-Division Multiple Access (TDMA), Multi-User MIMO (MU-MIMO), General Packet Radio Service (GPRS), extended GPRS (EGPRS), Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth□, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks.

In this description, the term "package" refers to hardware components (e.g., CPU, memory, and I/O devices) that may be interconnected and packed to form a system that may be integrated into a single unit with metallic finishing for physical mounting on a circuit board. That is, a package may be a full hardware module and that may be plugged into a server-chassis.

In various aspects, a package may include a CPU and non-CPU components, such as memory (DRAM modules), I/O devices, and accelerators.

In various aspects, components in a package may be interconnected with silicon vias, metallic wires or wireless by a RF signal interface.

In various aspects, a package may include only a single CPU chip (plus other non-CPU components). In various aspects, a CPU chip may include only one single CPU chip. In various aspects, a CPU chip may include a single CPU die, which in turn may include a plurality of CPU cores. In various aspects, a CPU chip may include a plurality of CPU dice that may be interconnected with an embedded multi-die interconnect bridge.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A receiver, comprising:
   a down-converter configured to down-convert a received communication signal, with a reference signal received from a reference signal generator;
   a processor configured
      to perform a signal quality detection to identify a signal quality metric of the received communication signal;
      to provide a frequency adjusting signal to the reference signal generator to change the frequency of the reference signal based on the performed signal quality detection to identify the signal quality metric of the received communication signal;
      to calculate an error vector magnitude of at least one symbol of the received communication signal; and
      to estimate the at least one of an adjusted carrier frequency or the adjusted symbol rate to decrease the error vector magnitude for at least one future symbol to be received with the communication signal at the at least one of the adjusted carrier frequency or the adjusted symbol rate.

2. The receiver of claim 1,
   wherein the processor is configured to generate the frequency adjusting signal based on the performed signal quality detection to identify the signal quality metric of the received communication signal at a predefined carrier frequency.

3. The receiver of claim 1,
   wherein the processor is configured to provide the frequency adjusting signal comprising an information related to an adjustment of the frequency of the reference signal within a predetermined frequency range.

4. The receiver of claim 1,
   wherein the processor is configured
      to estimate the at least one of an adjusted carrier frequency or an adjusted symbol rate based on the performed signal quality detection; and
      to generate the frequency adjusting signal comprising an information related to the adjustment of the reference signal based on the at least one of the adjusted carrier frequency or the adjusted symbol rate.

5. The receiver of claim 4,
wherein a ratio of the adjusted carrier frequency and the adjusted symbol rate is an integer.

6. The receiver of claim 1,
wherein the processor is configured
to calculate an eye opening for a first portion of the received communication signal at a predefined carrier frequency, and
to estimate the at least one of adjusted carrier frequency or adjusted symbol rate to increase the eye opening for a second portion of the communication signal to be received at the at least one of adjusted carrier frequency or adjusted symbol rate.

7. The receiver of claim 1,
wherein the processor is configured to estimate the at least one of adjusted carrier frequency or adjusted symbol rate based on a least mean square algorithm.

8. The receiver of claim 7,
wherein the processor is configured to provide an indication to at least one of the down-converter to down-convert signals at the adjusted carrier frequency or a demodulator to demodulate digital signals at the adjusted symbol rate.

9. The receiver of claim 1,
wherein the processor is configured to detect a portion of the received wireless communication signal including a plurality predetermined symbols and perform the signal quality detection to identify the signal quality metric of the received communication signal at a predefined carrier frequency using the detected portion of the received wireless communication signal.

10. The receiver of claim 1,
wherein the receiver is configured to receive wireless signal in a wireless connection with one or more chips within a common chip package.

11. A communication system, comprising:
a receiver, comprising
a down-converter configured to down-convert a received communication signal, with a reference signal received from a reference signal generator; and
a processor configured
to perform a signal quality detection to identify a signal quality metric of the received communication signal;
to provide a frequency adjusting signal to the reference signal generator to change the frequency of the reference signal based on the performed signal quality detection to identify the signal quality metric of the received communication signal;
to calculate an error vector magnitude of at least one symbol of the received communication signal; and
to estimate the at least one of an adjusted carrier frequency or the adjusted symbol rate to decrease the error vector magnitude for at least one future symbol to be received with the communication signal at the at least one of the adjusted carrier frequency or the adjusted symbol rate;
the reference signal generator comprising
an oscillator configured to generate the reference signal; and
the processor configured to adjust the frequency of the reference signal based on the frequency adjusting signal received from the receiver.

12. The communication system of claim 11, further comprising:
a transmitter configured
to receive the reference signal from the reference signal generator;
to modulate a signal to be transmitted using the reference signal to obtain a communication signal; and
to transmit the communication signal at a predefined carrier frequency.

13. The communication system of claim 12,
wherein the reference signal generator is coupled to the transmitter and the receiver via a first communication medium to provide the reference signal; and
wherein the transmitter is configured to transmit the communication signal via a second communication medium.

14. The communication system of claim 12, further comprising:
an encapsulating material encapsulating the receiver and the reference signal generator.

15. The communication system of claim 11, further comprising:
a further receiver, comprising:
a down-converter configured to down-convert a received further communication signal at a predefined further carrier frequency, with a further reference signal received from a further reference signal generator; and
a processor configured
to perform a further signal quality detection to identify a further signal quality metric of the received further communication signal at the predefined further carrier frequency; and
to provide a further frequency adjusting signal to the further reference signal generator to change the frequency of the further reference signal based on the performed further signal quality detection to identify the further signal quality metric of the received further communication signal at the predefined further carrier frequency;
the further reference signal generator, comprising:
an oscillator configured to generate the further reference signal at the predefined further carrier frequency; and
the processor configured to adjust the further frequency of the further reference signal based on the further frequency adjusting signal received from the further receiver.

16. A non-transitory computer readable medium comprising instructions stored thereon, that if executed, cause a processor to:
perform a signal quality detection to identify a signal quality metric of a received communication signal; and
provide a frequency adjusting signal to a reference signal generator to change the frequency of the reference signal based on the performed signal quality detection to identify the at least one signal quality metric of the received communication signal;
calculate an error vector magnitude of at least one symbol of the received communication signal; and
estimate the at least one of an adjusted carrier frequency or the adjusted symbol rate to decrease the error vector magnitude for at least one future symbol to be received with the communication signal at the at least one of the adjusted carrier frequency or the adjusted symbol rate.

17. The non-transitory computer readable medium of claim 16, further comprising instructions stored thereon, that if executed, cause a processor to:
   generate the frequency adjusting signal based on the performed signal quality detection to identify the signal quality metric of the received communication signal at a predefined carrier frequency.

18. A receiving means, comprising:
   a down-converting means for down-converting a received communication signal, with a reference signal received from a reference signal generator;
   a signal quality detection means for identifying a signal quality metric of the received communication signal; and
   a frequency adjusting signal provision means for providing a frequency adjusting signal to the reference signal generator to change the frequency of the reference signal based on the performed signal quality detection to identify the signal quality metric of the received communication signal at the predefined carrier frequency;
   a means for calculating an error vector magnitude of at least one symbol of the received communication signal; and
   a means for estimating the at least one of an adjusted carrier frequency or the adjusted symbol rate to decrease the error vector magnitude for at least one future symbol to be received with the communication signal at the at least one of the adjusted carrier frequency or the adjusted symbol rate.

19. The receiving means of claim 18, further comprising:
   a means for generating the frequency adjusting signal based on the performed signal quality detection to identify the signal quality metric of the received communication signal at a predefined carrier frequency.

* * * * *

UNITED STATES PATENT AND TRADEMARK OFFICE
CERTIFICATE OF CORRECTION

| | | |
|---|---|---|
| PATENT NO. | : 12,212,510 B2 | Page 1 of 1 |
| APPLICATION NO. | : 17/124536 | |
| DATED | : January 28, 2025 | |
| INVENTOR(S) | : Peter Sagazio et al. | |

It is certified that error appears in the above-identified patent and that said Letters Patent is hereby corrected as shown below:

In the Claims

Claim 18, Column 30, Lines 2-3: delete "at the predefined carrier frequency"

Signed and Sealed this
Fourth Day of March, 2025

Coke Morgan Stewart
*Acting Director of the United States Patent and Trademark Office*